(12) United States Patent
Ségur

(10) Patent No.: US 7,065,886 B2
(45) Date of Patent: Jun. 27, 2006

(54) MEASUREMENT AND LOCALIZATION SYSTEM USING BASES THREE AND NINE AND CORRESPONDING APPLICATIONS

(76) Inventor: Patrick Ségur, 33 rue Galilée, F-75116, Paris (FR)

( * ) Notice: Subject to any disclaimer, the term of this patent is extended or adjusted under 35 U.S.C. 154(b) by 0 days.

(21) Appl. No.: 10/678,791

(22) Filed: Oct. 3, 2003

(65) Prior Publication Data

US 2004/0064958 A1    Apr. 8, 2004

Related U.S. Application Data

(63) Continuation of application No. PCT/FR02/01203, filed on Apr. 5, 2002.

(30) Foreign Application Priority Data

Apr. 5, 2001    (FR) .................................. 01 04656

(51) Int. Cl.
G09B 29/10    (2006.01)
G09B 29/00    (2006.01)

(52) U.S. Cl. .................... 33/1 CC; 33/1 F; 434/150; 434/153; 701/208

(58) Field of Classification Search ............. 33/1 F, 33/1 G, 1 H, 1 B, 1 CC, 1 SB, 1 SA, 1 D, 33/562, 563, 566, 431, 679.1, 474; 434/131, 434/141, 150, 153, 213, 214; 701/208
See application file for complete search history.

(56) References Cited

U.S. PATENT DOCUMENTS

| | | | | | |
|---|---|---|---|---|---|
| 1,965,337 | A | * | 7/1934 | Geyer | ........................ 33/1 A |
| 3,063,163 | A | * | 11/1962 | Dukes, Jr. | .................... 434/131 |
| 3,500,558 | A | * | 3/1970 | Matejczyk | ................... 434/189 |
| 3,599,350 | A | * | 8/1971 | Moskowitz | ................. 434/189 |
| 3,604,620 | A | * | 9/1971 | Rakes | ......................... 235/69 |
| 3,670,958 | A | | 6/1972 | Radosavljevic et al. | .. 235/70 A |
| 4,315,747 | A | * | 2/1982 | McBryde | .................... 434/150 |
| 4,924,402 | A | * | 5/1990 | Ando et al. | ................. 701/208 |
| 5,030,117 | A | * | 7/1991 | Delorme | ..................... 434/130 |
| 5,362,239 | A | * | 11/1994 | Pfuetze | ....................... 434/153 |
| 5,422,813 | A | * | 6/1995 | Schuchman et al. | ........ 455/440 |
| 5,422,814 | A | | 6/1995 | Sprague et al. | ............ 701/213 |
| 5,445,524 | A | * | 8/1995 | Jones | ......................... 434/153 |

(Continued)

Primary Examiner—R. Alexander Smith
(74) Attorney, Agent, or Firm—DLA Piper Rudnick Gray Cary US LLP

(57) ABSTRACT

A system for localizing a zone in space in relation to a predetermined point on a surface, wherein the surface is divided into nine zones of first rank obtained by dividing the surface into three parts in two different directions, a predetermined respective number from 1 to 9 is attributed to each of the zones of first rank, each zone of rank n, n being a whole number greater than or equal to 1, is divided successively into zones of rank n+1, a predetermined respective number from 1 to 9 being attributed to each of the zones of rank n+1 of a zone of inferior rank n, and a zone of rank n is position referenced by a zone reference sequence having n digits containing the number of the zone, the respective numbers of all of the zones of inferior rank, 1 to n−1, in which the zone is located, including means for determining the position reference sequence of a zone of rank n in which is located a zone to be localized in the surface, n being the maximum value such that the surface of the zone to be localized is included in the zone of rank n, and means for transmitting and/or receiving and/or displaying and/or using such a position referencing sequence.

19 Claims, 10 Drawing Sheets

U.S. PATENT DOCUMENTS

| | | | |
|---|---|---|---|
| 5,479,482 A * | 12/1995 | Grimes | 455/556.1 |
| 5,759,040 A * | 6/1998 | Harunah | 434/153 |
| 5,767,788 A * | 6/1998 | Ness | 340/825.49 |
| 5,772,441 A * | 6/1998 | Wilson | 434/236 |
| 5,901,074 A * | 5/1999 | Nakano et al. | 708/142 |
| 5,902,347 A * | 5/1999 | Backman et al. | 701/200 |
| 5,960,337 A * | 9/1999 | Brewster et al. | 455/404.2 |
| 5,974,356 A * | 10/1999 | Doyle et al. | 701/209 |
| 5,995,042 A * | 11/1999 | Durboraw et al. | 342/357.02 |
| 5,999,124 A * | 12/1999 | Sheynblat | 342/357.09 |
| 6,026,304 A * | 2/2000 | Hilsenrath et al. | 455/456.2 |
| 6,186,795 B1 * | 2/2001 | Wilson | 434/236 |
| 6,701,307 B1 * | 3/2004 | Himmelstein et al. | 707/3 |

\* cited by examiner

|  |  |
|---|---|
| Northwest | Northeast |
| Southwest | Southeast |

Fig. 1

PRIOR ART

| Northwest 6 | North 2 | Northeast 7 |
|---|---|---|
| West 5 | Center 1 | East 3 |
| Southwest 9 | South 4 | Southeast 8 |

Fig. 2

| 66 | 62 | 67 | 26 | 22 | 27 | 76 | 72 | 77 |
|---|---|---|---|---|---|---|---|---|
| 65 | 61 | 63 | 25 | 21 | 23 | 75 | 71 | 73 |
| 69 | 64 | 68 | 29 | 24 | 28 | 79 | 74 | 78 |
| 56 | 52 | 57 | 16 | 12 | 17 | 36 | 32 | 37 |
| 55 | 51 | 53 | 15 | 11 | 13 | 35 | 31 | 33 |
| 59 | 54 | 58 | 19 | 14 | 18 | 39 | 34 | 38 |
| 96 | 92 | 97 | 46 | 42 | 47 | 86 | 82 | 87 |
| 95 | 91 | 93 | 45 | 41 | 43 | 85 | 81 | 83 |
| 99 | 94 | 98 | 49 | 44 | 48 | 89 | 84 | 88 |

MEASUREMENT AND LOCALIZATION SYSTEM USING BASES THREE AND NINE AND CORRESPONDING APPLICATIONS

RELATED APPLICATION

This is a continuation of International Application No. PCT/FR02/01203, with an international filing date of Apr. 5, 2002, which is based on French Patent Application No. 01/04656, filed Apr. 5, 2001.

FIELD OF THE INVENTION

This invention pertains to a system for measuring angles, lengths and time using bases 3 and 9 and its applications for defining and localizing a zone in space. It particularly enables digital localization of a zone in space and in time. The invention has applications especially, but not exclusively, in the fields of geography and cartography.

BACKGROUND

Current measurement systems depend on countries and individuals. There are numerous systems and they are barely harmonized. Nevertheless, the decimal system is now widely used in the world and the metric system created in France in 1795 has attained a certain degree of success during the past two centuries. An international system of units was created in 1960 and international units were defined.

Thus, the international system defined seven base units, i.e., the meter (length), the kilogram (mass), the second (time), the ampere (intensity of the electric current), the Kelvin (temperature), the mole (amount of matter) and the candela (luminous intensity). Among these seven base units, six use the decimal system as multiple or submultiple factors. Thus, for the multiples of these units the terms of deca (10), hecto ($10^2$), kilo ($10^3$), mega ($10^6$), giga ($10^9$), etc. are used. For the submultiples use is made symmetrically of the terms deci ($10^{-1}$), centi ($10^{-2}$), milli ($10^{-3}$), micro ($10^{-6}$), nano ($10^{-9}$), etc.

However, the decimal system is not used for the measurement of time, but rather a mixed system employing partially the base 60: the unit being the second, 60 seconds forming one minute, 60 minutes forming one hour and 24 hours forming one day, one year being constituted by 365 days.

Neither was the decimal system retained for the measurement of angles: a circle is comprised of 360 degrees (4 times 90 degrees), with the submultiples of the degree being the minute (one degree comprises 60 minutes) and the second (one minute comprises 60 seconds).

It can be useful to question the relevance of the choices that were made when adopting these various units and base units of the international system since, in fact, these units exhibit a certain degree of incoherence: a decimal system was chosen in one case (length), a hexadecimal system was selected in a second case and in a third the system is only partially hexadecimal (90 then 60).

It will furthermore be seen that quite recently (during the 1990s), in the field of geography, still a fourth more complex system was introduced for defining the geographic positioning of a point on Earth: in fact, not two, but three different systems of units are used in GPS devices ("Global Positioning Systems") which make it possible to specify from satellites the position of a point on the surface of the Earth or in space.

The latitude and longitude of a point are defined in GPS first in terms of degrees (base 360), then in minutes (base 60) and then finally not in seconds (base 60) but in thousandths of minutes (base 1000) for the majority of receivers.

Professional GPS receivers, which are considerably more precise, use the degree, the minute, the second and then decimals of seconds (tenths, hundredths, thousandths, etc.).

It should also be noted that for the measurement of lengths, the meter, the measurement unit of the international system, is not used in numerous fields: thus, in maritime navigation the nautical mile is used (one arc minute measured on the meridian, i.e., 1852 m). In aeronautical navigation, altitudes are measured at the international level in feet (one foot is equal to 33 cm) and not in meters.

Three units have been defined for the measurement of plane angles: the radian, the degree and the grad. The radian is the angle which, having its vertex at the center of a circle, intercepts on the circumference of this circle an arc of a length equal to the radius of this circle. Thus, if the radius of the circle is set to be equal to 1, the radian is the angle which intercepts on the circumference an arc also measuring 1, the perimeter of the circle then being equal to $2\pi$.

The degree is defined as the angle representing the $360^{th}$ part of the circle, with the circle being able to be divided into 4 parts equal to 90°. One degree is equivalent to 60 minutes and one minute is equivalent to 60 seconds of arc. The degree is a sexagesimal unit of arc measurement.

The grad is defined as the angle which represents the $400^{th}$ part of the circle, it being possible to divide the circle into 4 parts equal to 100 grads (or gons). One grad is equivalent to 10 decigrads, 100 centigrads or 1000 milligrads. The grad is a decimal unit of arc measurement.

Thus, we have the following equalities for the measurement of plane angles:

$2\pi$ radians=360°=400 grads.

1 radian =180/$\pi$=57°17'44"=63.662 gons or grads.

It can be seen that the division of the circle into degrees, minutes or seconds is not very practical for the units smaller than the second of an angle, units which are very widely used especially in astronomy. If we followed the base 60 logic that we would have defined a unit which is the $60^{th}$ part of a second and we would have thus continued the division of the arc units in a sexagesimal system. This did not occur and it seemed to be easier for users to use the decimal system for angle measurement units smaller than the second. Thus, the position of stars in the sky is defined with precision expressed in hundredths, thousandths or ten-thousandths of a second. Thus, telescopes use these units which are more rarely used in nonprofessional astronomical telescopes.

In contrast, it is surprising to note that the use of the grad is extremely common in topography for triangulations and the measurement of angles when performing point surveys. Tachymeters, theodolites, holometric or leveling alidades and angle measurement systems in fact often use either percentages or centesimal minutes as measurement units for slopes or angles. In aerial or spatial photogrammetry the view-finding and photographs are performed using view-finders often defined first in degrees for the field objectives (90°, . . . ): analogical or analytical stereorestorers used in aerotriangulation, etc.

With regard to the positioning of a point on the surface of the Earth, it has been implemented for many centuries and still at present on the basis of two measurements: its longitude and its latitude, both expressed in degrees. The use of the radian and of the grad is in fact not widely used for defining the coordinates of a terrestrial point.

For longitude, the international reference is the Greenwich meridian: longitude is defined as ranging from 0 to 180° to the east of the Greenwich meridian and from 0 to 180° to the west of the Greenwich meridian. The reference for latitude is the equator: north latitude is defined as 0 to 90° going from the equator to the North Pole and south latitude as 0 to 90° going from the equator to the South Pole. This system is based on the principle of the division of the Earth's surface into four principal zones: the Earth is cut vertically into two parts at the meridian set since 1884 in Greenwich, a town located to the east of London, England. The Earth is also cut into two parts horizontally at the equator. These four zones are represented schematically in FIG. 1.

Any point on the Earth is necessarily situated in one of these four zones and all of the geographic coordinate systems used at present, notably for maritime, aerial and more recently terrestrial navigation, are based on this principle. The GPS satellite positioning referencing system is also based on this principle of dividing the Earth.

Limiting it to whole degrees, this position referencing system divides the Earth into four zones of 16,200 sectors (180×90), i.e., a total of 64,800 sectors (4×16,200). This system has the advantage of being very simple and conforming to the classic position referencing system for points in a plane in which four zones are also distinguished:

zone 1: ++: positive abscissas and ordinates (Northeast)
zone 2: +−: positive abscissas and negative ordinates (Southeast)
zone 3: −+: negative abscissas and positive ordinates (Northwest)
zone 4: −−: negative abscissas and ordinates (Southwest).

By merging the abscissas with the meridians and the ordinates with the parallels, the axis of the abscissas represents the equator and the axis of the ordinates represents the Greenwich meridian.

However, this position referencing system has the major drawback of using a partially sexagesimal system for angles. This principle uses a first division performed on the basis of a circle of 360 degrees (divisible 4 times 90 degrees, which allows definition of straight angles (180°) and right angles (90°). Then there is a sexagesimal division, passing to a base 60 for the minutes and seconds. Thus, there is neither continuity nor logical integrity between the primary unit (the degree) and the secondary units (the minute which is equivalent to 1/60 of the degree) and the second (which is equivalent to 1/60 minute and 1/3600 degree).

To eliminate this drawback, it has been proposed to use a division of the circle not into degrees, but into grads (a circle of 400 grads is divided into 4 sectors comprised of 100 grads each). This division conserves the straight angles (200 grads) and the right angles (100 grads) and is continuous in its decimals since the secondary units are the decigrad (1/10 grad), the centigrad (1/100 grad) and the milligrad (1/1000 grad). It is this second system which is widely used in France by the National Geographic Institute (IGN), in particular, in the Lambert 2 projections used on all IGN maps.

Whichever of the divisions above is used, this position referencing principle has the disadvantage of referencing a point without taking into account the precision of the measurement nor providing information on this precision. An arc degree, thus, represents along a meridian 111 km, a minute 1,852 m and a second 30.9 m. In reality, the coordinates of a point do not define a point, but rather a zone whose dimensions (expressed in degrees, minutes or seconds) depend on the precision or imprecision of the measurement.

It would accordingly be advantageous to eliminate these drawbacks by providing a localization system for localizing a zone in space in relation to a predetermined point situated on a surface.

SUMMARY OF THE INVENTION

This invention relates to a system for localizing an area in space in relation to a predetermined point on a surface, wherein the surface is divided into nine zones of first rank obtained by dividing the surface into three parts in two different directions, a predetermined respective number from 1 to 9 is attributed to each of the zones of first rank, each zone of rank n, n being an integer number greater than or equal to 1, is divided successively into zones of higher rank n+1, a predetermined respective number from 1 to 9 being attributed to each of the zones of rank n+1 of a zone of rank n, and a zone of rank n is localized by a zone reference sequence having n digits containing the number of the zone, the respective numbers of all of the zones of lower rank, 1 to n−1, in which the zone is located, including means for determining the zone reference sequence of a zone of rank n in which is located an area to be localized in the surface, n being the maximum value such that the surface of the area to be localized is included in the zone of rank n, and means for transmitting and/or receiving and/or displaying and/or using such a zone referencing sequence.

This invention also relates to a method of geographically localizing a zone of a terrestrial globe in relation to a predetermined meridian of the terrestrial globe including dividing the terrestrial globe into two hemispherical zones with a radial plane passing through the meridian, dividing the surface of each hemispherical zone into zones of rank n obtained by dividing successively each zone of inferior rank n−1 into three substantially identical spherical sectors by two radial planes each including a respective meridian, and each of three spherical sectors by two planes perpendicular to the radial planes each including a respective parallel, n being a whole number equal to or greater than 1, attributing a predetermined respective number from 1 to 9 to each of the zones of rank n in each zone of inferior rank n−1, determining the position of the zone to be localized by associating the respective numbers of zones of rank 1 to n, and a respective sign indicating the hemispherical zone in which is located the zone to be localized, to obtain a position referencing sequence of this zone, and transmitting and/or receiving and/or displaying and/or using such a position referencing sequence.

BRIEF DESCRIPTION OF THE DRAWINGS

A preferred embodiment of the invention will be described below as a non-limiting example with reference to the attached drawings in which:

FIG. 1 represents a division of the surface of a plane zone in accordance with the prior art;

FIG. 2 represents an example of the division of the surface of a zone into nine parts in accordance with aspects of the invention;

FIG. 3 represents a division of the surface of a zone into 81 parts (or 100 in base 9) according to aspects of the invention;

DETAILED DESCRIPTION

Figure 4:
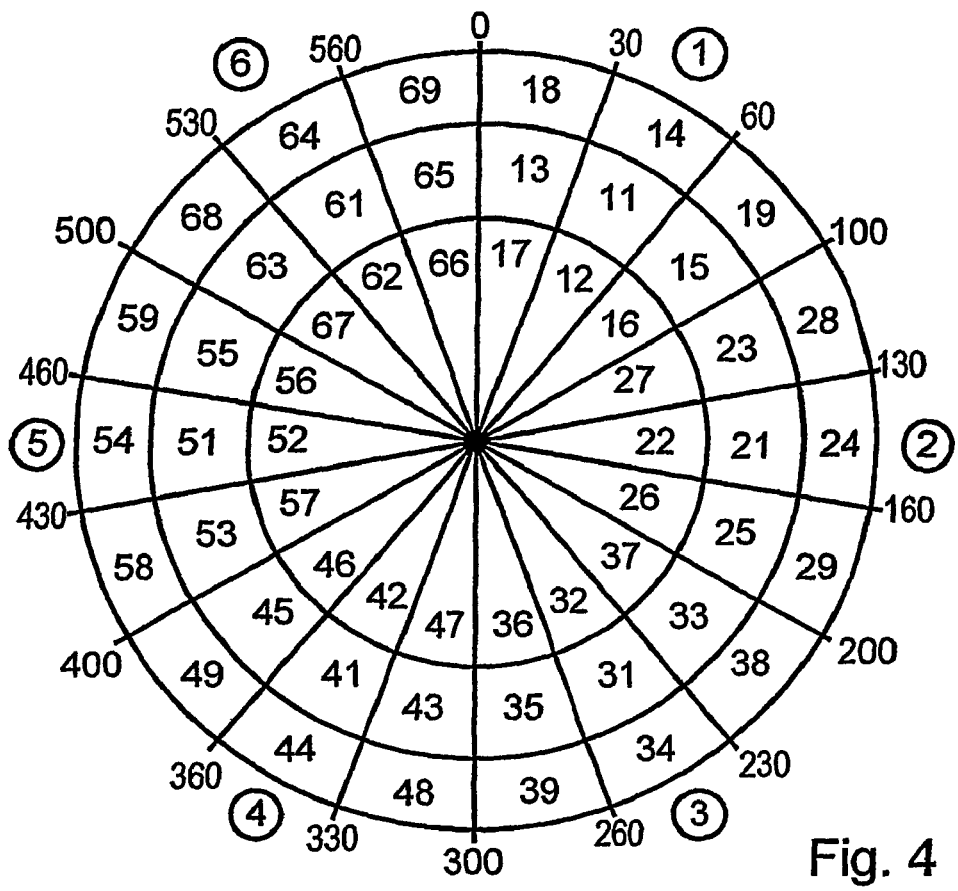
FIG. 4 represents the division of a circular surface into 18 zones (20 in base 9), then 54 zones (60 in base 9), and the division of a circular contour into 486 sectors (600 in base 9), according to aspects of the invention.

The system of the invention uses a division of the surface into zones in which:
- the surface is divided into nine zones of first rank obtained by dividing the surface into three parts in two different directions,
- a predetermined respective number from 1 to 9 is attributed to each of the zones of first rank,
- each zone of rank n, n being an integer number greater than or equal to 1, is divided successively in the same manner into zones of higher rank n+1, a predetermined respective number from 1 to 9 being attributed in the same manner to each of the zones of rank n+1 of a zone of rank n,
- a zone of rank n is localized by a zone reference sequence comprising n digits containing the number of said zone, the respective numbers of all of the zones of lower rank, 1 to n−1, in which the zone is located.

The system comprises means for determining the position freference sequence of a zone of rank n in which is located a zone to be localized in the surface, n being the maximum value such that the surface of the zone to be localized is included in the zone of rank n, as well as the means for tranmitting and/or receiving and/or displaying and/or using such a position referencing sequence.

The surface is advantageously a surface of circular form, and is divided in advance into six equal sectors, nine zones of first rank being obtained for each sector by dividing the sector into three equal sectors and by two circles centered on the center of the surface, each zone of rank n being divided successively in the same manner into zones of rank n+1 in three sectors and by two circles centered on the center of the circular surface.

The zone division circles preferably have radii selected in a manner such that all of the zones of rank n have the same surface. Also preferably, the zone division circles have radii selected in a manner such that all of the zones of rank n have a constant radial width.

According to one particular embodiment, in the case in which the surface is an essentially spherical surface, the zone to be localized is position referenced in relation to a predetermined meridian of the spherical surface, the spherical surface having been previously divided into two hemispherical zones by a radial plane passing through a meridian selected as reference, the nine zones of first rank being obtained by dividing each hemispherical zone into three spherical sectors of identical preference by two radial planes each including a respective meridian, and each of the three spherical sectors by two planes perpendicular to the radial planes each including a respective parallel. The spherical surface is advantageously the surface of the terrestrial globe.

According to another embodiment, in order to localize a zone in space, the system comprises means for determining a cone in which is located the zone in space, the cone having for its center the center of the spherical surface and for directrix curve the contour of the zones of rank n, n being the maximum value such that the zone to be localized is included in the cone.

According to another embodiment, the system comprises means for associating with all fixed or mobile elements in relation to the sphere the position referencing sequence of the zone of rank n in which the element is located.

According to still another embodiment, the system comprises means for converting a position referencing system into at least two coordinates respectively according to a meridian and a parallel of the spherical surface, in relation to a point selected as origin and vice versa.

The system advantageously comprises at least one device comprising reception means for receiving localization signals, calculation means for determining a position reference sequence of a zone of rank n in which the device is located, the rank n being selected in a manner to correspond to the precision of the localization signals. The localization signals are preferably transmitted by satellites in orbit around the terrestrial globe.

Also preferably, the device is a cellular telephone network terminal comprising a multiplicity of local retransmission relays designed to serve a respective cell, each local relay transmitting as localization signal a position referencing sequence for a zone of rank n, the rank of which is greater than or equal to the maximum value such that the cell served by said local relay is included in said zone, the terminal comprising means for displaying the position referencing sequence received.

According to another embodiment, the system comprises a geographic map showing the division of the terrestrial globe into zones of rank n, and indicating the position referencing sequences associated with the zones, the value of rank n being selected in a manner such as to be adapted to the scale of the map.

According to another embodiment, the system comprises a tool designed to be pointed at a point and means for pointing the tool in a zone determined by the position referencing sequence. The surface in which a zone is to be localized is preferably a digital image constituted by pixels, and in that the cutting up of the image into zones is adapted to the size and to the number of pixels of the image.

According to another embodiment, the system comprises a calculator adapted to the conversion of numbers of base 10 to base 9 and vice versa.

The invention also pertains to a geographic localization method for localizing a zone of the terrestrial globe in relation to a predetermined meridian of the terrestrial globe. According to the invention, the method comprises steps consisting of:
a) dividing the terrestrial globe into two hemispherical zones by means of a radial plane passing through the referenced meridian,
b) dividing the surface of each hemispherical zone into zones of rank n obtained by dividing successively each zone of lower rank n−1 into three preferably identical spherical sectors by two radial planes each including a respective meridian, and each of three spherical sectors by two planes perpendicular to the radial planes each including a respective parallel, n being an integer number equal to or greater than 1,
c) attributing a predetermined respective number from 1 to 9 to each of the zones of rank n in each zone of inferior rank n−1,
d) determining the position of the zone to be localized by associating the respective numbers of zones of rank 1 to n, and a respective sign indicating the hemispherical zone in which is located the zone to be localized, to obtain a position referencing sequence of this zone, and
e) transmitting and/or receiving and/or displaying and/or using such a position referencing sequence.

Turning now to the drawings, the invention proposes a system using base 9 rather than the present decimal system using base 10.

In the plane, any open or closed plane zone can be surrounded by a polygon of three or four sides which, in this latter case, can be selected to be a quadrilateral form of trapezoidal, parallelogram, rectangular or square form. According to the invention, each side (each of the two dimensions which we will refer to as length and width) of this closed contour is divided into three, which defines nine interior zones of the polygon (a rectangle in the example of figure) surrounding FIG. 2.

A numeration of these nine zones can be defined, for example, in the following manner:
the central "Center" zone is numbered 1.
the North" zone located above the "Center" is numbered 2.
the "East" zone located to the right of the "Center" is numbered 3.
the "South" zone located below the "Center" is numbered 4.
the "West" zone located to the left of the "Center" is numbered 5.
The four remaining zones "Northwest", "Northeast", "Southeast" and "Southwest" are numbered 6, 7, 8 and 9, respectively, according to a circular numbering following the numbering of the five preceding zones as indicated in FIG. 2. This numbering is, of course, completely arbitrary. Any other numbering system employing digits or letters can be employed without going beyond the concept of the invention.

Each side of the zones of first rank is then divided successively into three, such that we can obtain a division of each zone of first rank into nine zones of second rank. In the same manner as described above, a respective number from 1 to 9 is then attributed to each zone of second rank in each of the zones of first rank, this number being associated with the number of the zone of first rank in which it is located (FIG. 3).

The principle of division as described above is extended to the higher rank, then to the rank n.

In this manner, a zone of rank n is thus position referenced by a zone position reference sequence comprising n digits containing the number of said zone, the respective numbers of all zones of rank rank, from 1 to n−1, in which said zone is located.

A computer program comprises means for determining and performing the successive divisions by three of the sides of the polygon, and performing the automatic numbering of a zone of rank n in which is located an object to be localized, n being the maximum value such that the surface of the object to be localized is included in zone of rank n.

The invention also provides a new division of the circle which completes that of the circle according to the three preceding units (radian, degree, grad) and their divisions.

It should first be acknowledged that any diameter of the circle is an axis of symmetry for the circle. If we use by definition "grado" as a new measurement unit for the angles of the circle, the circle will thus be defined by a multiple of 2 of the number of "gradoj" to be determined.

Trying to avoid retaining a new division of the circle by 2, we will choose to deviate resolutely from the existing units (degree and grad) by choosing a division of the semicircle not into two, but rather into three equal parts.

The circle is, thus, divided into 6 equal parts which are labeled the six base zones or sectors which are, for example, numbered from 1 to 6 either in the counterclockwise direction or in the clockwise direction depending on the requirements (FIG. 4). The numbers of the sectors are shown encircled in FIG. 4.

To use with continuity the method applied to a polygon, each sector of the circle is divided into three equal sectors; the circle is thus divided into 18 equal sectors. Continuing this division by three, a third, fourth and then a fifth time, the circle is divided successively into 54, 162 and then 486 equal parts. In base 9, each part of the circle is divided into 100 equal parts (81 in base 10=100 in base 9) and the circle is in its totality divided into 6×100=600 equal sectors.

Since the number 486 is higher than 360 (used for degrees) and 400 (used for grads), the angle unit defined in this manner is smaller than a degree or a grad. Thus, we define a new unit "grado" (degree in Esperanto). The grado is, thus, the angle which, having its apex at the center of the circle, divides this circle into 486 equal parts. This angle intercepts on the circumference of a circle an arc the length of which is the $486^{th}$ part of the perimeter of the circle. The following equalities are:
2π radians=486 gradoj=400 grads=360 degrees.
FIG. 4 shows the gradations in gradoj numbered by 10 in 10 from 0 to 600 in base 9.

Since the determination of the new unit was developed by dividing the circle first into two then 5 times by 3, it can be decided to continue this division by 3. By performing it four times we obtain a division of the grado by 81. The definition of the $81^{st}$ part of the grado is a "minuto".

Continuing four times the division by 3 of the minute, we obtain a division of the minuto into 81 new units "sekundo".

With these successive divisions of the semicircle by three, we have, thus, defined three new measurement units for the arcs of a circle (the grado, the minuto, the sekundo) which are linked by the following equalities:
1 grado=2π/486=π/243=81 minutoj.
1 minuto=81 sekundoj.
or in base 9:
1 grado=100 minutoj, and
1 minutoj=100 sekundoj.

Remaining with the fundamental principle of successive divisions by 3 and exclusively by 3 we defined new units by dividing the preceding unit by 81, i.e., four times by three.

Thus, we defined successively:

1 sekundo=81 sekuntrio 1 sekuntrio=81 sekunkvaro 1 sekunkvaro=81 sekunkvino, etc.

Each unit bears by definition a name composed of the prefix "sekun" followed by the digit (expressed in Esperanto) which indicates its rank in relation to the grado (tri=3, kvar=4, kvin=5, etc.) and ends in "o".

In angle units, the complete circle thus represented in base 10:

$2\pi$ radians=486 gradoj=39,366 minutoj=3,188,646 sekundoj=258,280,326 sekuntrio=20,920,706,406 sekunkvaro, etc.

The table below presents a comparison of the successive divisions of the circle according to the four units employed (radian, degree, grad and grado).

Depending on the application, the division of the radius is effected in equal parts or in a manner such that the surfaces of the zones resulting from this division are equal. In this second case, the radii of the interior circles are first proportional to the radius divided by root of 3 for the first circle and for the radius divided by root of 3 and multiplied by root of 2 for the second circle. This method of successive divisions by the square root of the preceding radius enables definition with precision of the circles of successive radii R divided by root of 3, the R divided by root of root of 3, then R divided by root of root of root of 3, etc. By crossing these divisions of the radii with the divisions of the arcs of the circle according to the same powers, we define successively the zones numbered with 2, 3, 4, 5, . . . n digits, all digits comprised between 1 and 9, the groups together and, thus, the numbers of the zones in question being performed preferably as in the case of the rectangle with punctuations for the 6 base zones and all 4 digits of the numbers of the zones in question.

TABLE 1

(comparison of radians, degrees, grads and gradoj)

| Unit | Radian | Degree | Name | Grad | Name | Grado | Name | Grado (base 9) |
|---|---|---|---|---|---|---|---|---|
| Circle | $2\pi$ | 360 | degrees(°) | 400 | grads | 486 | gradoj | 600 |
| 1$^{st}$ div | $2\pi/n$ | 21,600 | minutes(') | 40,000 | centrigrads | 39,366 | minutoj | 60,000 |
| 2$^{nd}$ div | | ,1296,000 | seconds(") | 4,000,000 | | 3,188,646 | sekundoj | 6,000,000 |

It wil be noted that by construction all of the divisors of the grado are expressed in multiples of 3 and 9.

It will be noted that the divisions of the circle depart from a point A generally located at the bottom of the circle and mount to the right in a counterclockwise direction.

It is also possible to make the departure from the horizontal to the left of the circle turning either in the clockwise direction or the counterclockwise direction.

For the measurement itself of the angles in the plane, the invention provides a protractor enabling measurement of the angles in gradoj or in gradoj and in degrees.

The base graduations in gradoj are multiples of 3 expressed in base 9: 3, 6, 10, 13, 16, 20, 23, 26, 30, . . . , 580, 583, 586, 600. All of the angles are thus by construction multiples of three in these three angle measurement units. They are also all divisible by 3 because they are expr4essed in units which are themselves by construction multiples of 3.

A straight angle, thus, measures 300 gradoj in base 9. A right angle measures 144 gradoj, 44 minutoj, 44 sekundoj, 44 sekuntrioj, etc. This means that a right angle cannot be expressed as a whole number in gradoj or in its divisors.

Thus, by convention a right angle=144+gradoj, the + sign indicating the the 144$^{th}$ grado should be divided by 2 or, that which is equivalent, that it is necessary to add to 144 an infinite succession of its divisors, i.e., 44 minutoj +44 sekundoj +. . .

In the circle thereby divided into six equal sectors, the radius is also divided into a number of parts which are multiples of 9, and the zones defined by radii defining each sector are numbered starting from the center of the circle according to the same numbering as that applied above to the rectangle.

FIG. 4 shows the division of each sector into nine zones numbered from 1 to 9, this number being associated with the sector number.

It is nevertheless possible to not divide the circle into 600 gradoj, but rather remain with a division by 6, 20 (18 in decimal system), 60 (54 in decimal system), 200 (162 in decimal system) which limits the number of digits of the interior zones depending on the case to 2, 3 or 4 rather than 5 in the case of a division into 600 gradoj.

In the case of a division of the circle into 600 gradoj, each of the 10,000 of the 6,561 zones (10,000 in base 9) of each base sector thus has a precise numbering with 4 digits. A computer program system is applied which enables automatic numbering of these 6561 zones according to the angle established in relation to the basis axis and in relation to each of the radii (defined as stated above) of the circles of the principal zones.

This division of a circular surface can also be applied to an elliptical surface and, more generally, to any closed surface or surface delimited by a closed curve for which a reference axis would be defined as well as a central reference point. In the case of any closed surface, one would use advantageously a circle (or an ellipse) circumscribing the surface to implement the numbering of the zones according to the process described above.

The computer program system according to the invention enables a mobile position referencing around the central axis of the circle to effect a counterclockwise rotation by commencing by the bottom of the circle from the radius OA of origin.

One establishes a first reference point tangent to the southernmost part of the zone or object to be analyzed, which determines a first angle phi1 between OA and OM1, M1 being the point of the intersection circle with the radius tangent to the zone or the object to be analyzed. The angle phi1 is expressed in radians or in gradoj.

A second reference point is established tangent to the northernmost part of the zone or the object to be analyzed, which determines a second angle phi2 between OA and OM2.

The distance to the center of the sphere is determined from a reference point concentric to the circle which becomes progressively distant from the center and determines successively two radii R1 and R2, tangents respectively one to the part of the zone or object closest to the center (for R1) and the other to its most remote part (for R2). The two circles R1 and R2 and the two radii OM1 and OM2 thus determine a disk of the circle surrounding the zone or object to be analyzed.

The numbers of the circumscribed zones are automatically with or without grouping together displayed and stored in memory and the surface in question is calculated.

The computer program also enables a fine analysis of the lateral parts of the zone in question upon simultaneous displacement of the concentric reference point of R1 toward R2 and of the axis of rotation around the center of the circle.

For a spherical surface, a reference plane is defined which divides the sphere into two equal hemispheres.

The reference plane can advantageously be selected such that it divides the sphere in two vertically (or for stars and notably for the Earth along the axis of rotation) and that it passes through a precise point of the surface of the sphere (for the Earth the precise point was selected in 1884 in England, which defines the Greenwich meridian which is a circle that passes also through both poles, and the reference axis which passes through both poles).

The term "reference point" refers to the point of the reference axis located lowest (or most southerly) on the great reference circle (great intersection circle of the reference plane and the sphere). The term "meridians" refers to the great circles passing through the reference point.

The term "parallels" refers to the circles centered on the reference axis and which are perpendicular to the reference axis.

Each meridian is divided into three equal parts. Thus, we can define two parallels P1 and P2 which divide the sphere into 3 parts defined by angles of $\pi/3$ in relation to the reference axis (FIG. 5).

Each hemisphere having as base the reference plane is divided into nine zones defined:
on the one hand by two equidistant meridians M1 and M2 which form an angle of $\pi/3$ in relation to the reference axis, and
on the other hand by the two parallels P1 and P2 defined above.

The sphere is, thus, divided into 18 sectors by the six principal meridians (three in each hemisphere) and the two principal parallels. Each meridian and each parallel is divided into 100 gradoj (81 in base 10), into 10,000 minutoj (6,561 in base 10) and into 1,000,000 sekundoj (531,441 in base 10).

Figure 5:
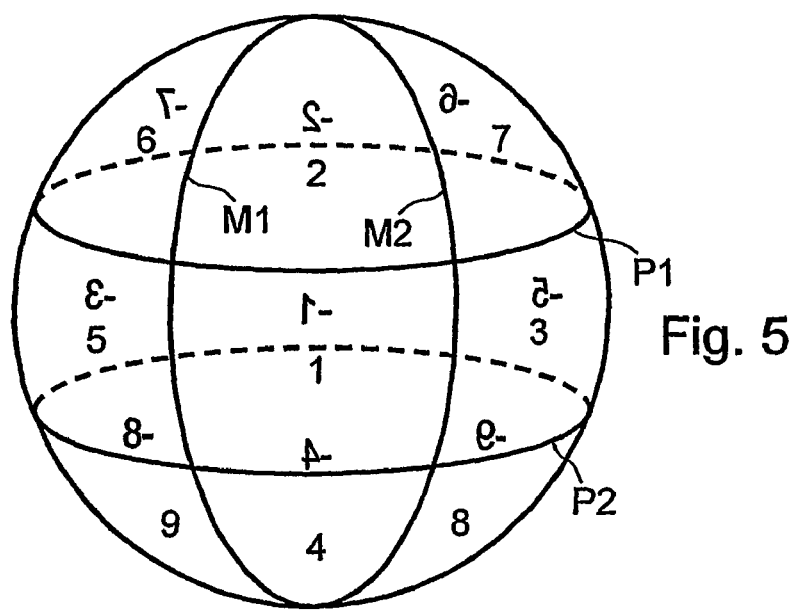
FIG. 5 represents the division of the surface of a sphere into 18 zones according to aspects of the invention.

The numbering of the zones of the sphere is performed in two stages: the 9 East zones are numbered from 1 to 9 according to the same rules as for the rectangle starting from the South Pole (FIG. 5). The numbering of the 9 principal zones of the West zone is performed in the same manner but using negative numbers from −1 to −9.

For the projections of zones of a sphere or an ellipsoid on a plane, one selects a plane or a cone intersecting the sphere, plane passing through the four points defined as being the intersection points of the 2 parallels and 2 meridians which divide in three the 2 parallels and the 2 meridians which determine the extreme limits in longitude and latitude of the zone to be represented. The altitudes of the 4 points are selected to enable the definition of the cone or plane in question.

As in the case of plane zones, each zone can itself be divided into nine zones whose first digit remains unchanged, but whose second digit corresponds to the numbering of its position in the zone of superior rank.

Thus, for the second level of geographic zones, the numberings are the following (FIG. 2):
Center: 1.1, 1.2, 1.3, 1.4, 1.5, 1.6, 1.7, 1.8, 1.9
North: 2.1, 2.2, 2.3, 2.4, 2.5, 2.6, 2.7, 2.8, 2.9
East: 3.1, 3.2, 3.3, 3.4, 3.5, 3.6, 3.7, 3.8, 3.9
South: 4.1, 4.2, 4.3, 4.4, 4.5, 4.6, 4.7, 4.8, 4.9
West: 5.1, 5.2, 5.3, 5.4, 5.5, 5.6, 5.7, 5.8, 5.9
Northwest: 6.1, 6.2, 6.3, 6.4, 6.5, 6.6, 6.7, 6.8, 6.9
Northeast: 7.1, 7.2, 7.3, 7.4, 7.5, 7.6, 7.7, 7.8, 7.9
Southeast: 8.1, 8.2, 8.3, 8.4, 8.5, 8.6, 8.7, 8.8, 8.9
Southwest: 9.1, 9.2, 9.3, 9.4, 9.5, 9.6, 9.7, 9.8, 9.9

The numberings of the zones of second rank on the sphere thus go from −1.1 to 9.9 and from 1.1 to 9.9 for the two hemispheres delimited by the principal plane.

Iterating this process of successive division by three of each side of the zones of rank n to obtain zones of superior rank, one numbers successively the nine smallest zones by adding to them a digit comprised between 1 and 9.

By dividing each side (for example the height and the length) of each zone of first rank by 100 in base 9 (81 in base 10), each of these 9 zones is composed of 10,000 interior zones of rank 5 in base 9 (6561 in base 10). The sphere is, thus, composed of 2×10,000×10=200,000 elementary zones (2×6561×9=118,098 elementary zones).

Each of these 100,000 elementary zones (59,049 in base 10) of each hemisphere can, thus, in this system be represented by a unique number composed of 5 digits and comprised between 1.1111 and 9.9999 (respectively −1.1111 and −9.9999), number which only comprises the digits from 1 to 9 and never 0.

By comparison, the present division of the Earth by 180° of East and West longitude and in 90° of North and South latitude results in a division of the Earth in 360×180=64,900 zones of 1° per side.

In contrast, it is not possible in the present system from this first division into degrees to continue the analysis further because one degree is equal to 60 minutes such that we are now passing from a base 360 to a base 60. The change of base (passage from a base 360 to a base 60) means that if we were to continue the division of each zone from 1° into 60′, i.e., into 3600 zones of 1′ per side, the total number of zones of 1′ per side would reach 64,800×3,600=233,280,000 zones of 1′ per side.

In the system according to the invention, if we further divide each side of each zone of rank 5 by 100 (81 in base) we obtain 200,000×10,000=2,000,000,000 zones (59,049× 6,561=387,420,489) zones of rank 9. Thus, each zone is on average 40% smaller in the system according to the invention than in the present system, and it can be represented by a unique number of 5+4=9 digits (ex: 1.8437.4729).

In the present system, it is not possible to represent each of the 64,800 elementary zones of 10 per side by a unique number. At most, one can represent each of the four summits of the zone by a number for the latitude and a number for the longitude (e.g., North 54°-East: 35°). Thus codification of the zones is not possible in the present system; codification can only be performed on the points.

Thus, the novelty of the system according to the invention is in the ability to codify zones, i.e., surfaces, by a single number which enables precise positioning of the zone in question on a sphere or on the Earth.

Moreover, in the interior of each of the 18 terrestrial zones, the 81 parallels and the 81 meridians determine zones for which a 4-digit number (all digits comprised between 1 and 9 but not 0) defines with precision the position of the terrestrial zone in question.

Thus, for example, the zone of rank 5, no. 6.9625 is located in the zone of base no. 6, then in zone of first rank no. 9, i.e., the southeast zone in relation to the base meridian. In the interior of this southeast zone, this base zone is located in the zone of second rank no. 6, i.e., the northwest zone. In the interior of this zone of second rank no. 96, this base zone is located in the zone of third rank no. 2, i.e., to the north. Finally, in the interior of this zone of third rank no. 962, this zone is located in zone 5, i.e., to the west. In summary, zone 6.9625 is located to the west, the north, the northwest, the southwest of the northwest zone of first rank, i.e., zone 6. Thus, with four iterations, it is possible to establish the reference point with precision of a base zone from its 4-digit number in each of the 18 base zones.

The system according to the invention also enables definition of the position of a point. For this purpose, the 0 is used to reference the center of each zone with this digit being added to the zone number.

Thus, number 59940 represents the center of zone no. 5994 and similarly 10 represents the center of the entire zone in this system.

To establish the reference points for the four summits of each of the zones, use is made according to the invention of a system of parallels and meridians, the geographic coordinates of each point of the sphere being defined by a longitude and a latitude which is advantageously expressed in base 9.

From the North Pole to the South Pole, each of the three elementary North, Central and South zones is divided into 81 parallels to respect the systematic use of base 3. By convention, one numbers in base 9 in each zone the parallels from South to North from 0 to 88. Thus in all we have 100×3=300 parallels (in base 9 or 81×3=243 in base 10) numbered from the South Pole to the North Pole, from South 0 to South 88, then Center 0 to Center 88, and finally from North 0 to North 88.

Taking as an origin the date line meridian (180° East or West), we divide each of the three elementary zones East, Central and West by 81 meridians. By convention, the meridians in each zone are numbered from West to East. Thus, in all we have 100×3=300 meridians (in base 9 or 81×3=243 in base 10) numbered in base 9 from West to East in the direction of the Earth's rotation (counting the limits of the zones) in the following manner: from West 0 to West 88, then from Center 0 to Center 88 and finally from East 0 to East 88.

Figure 6:
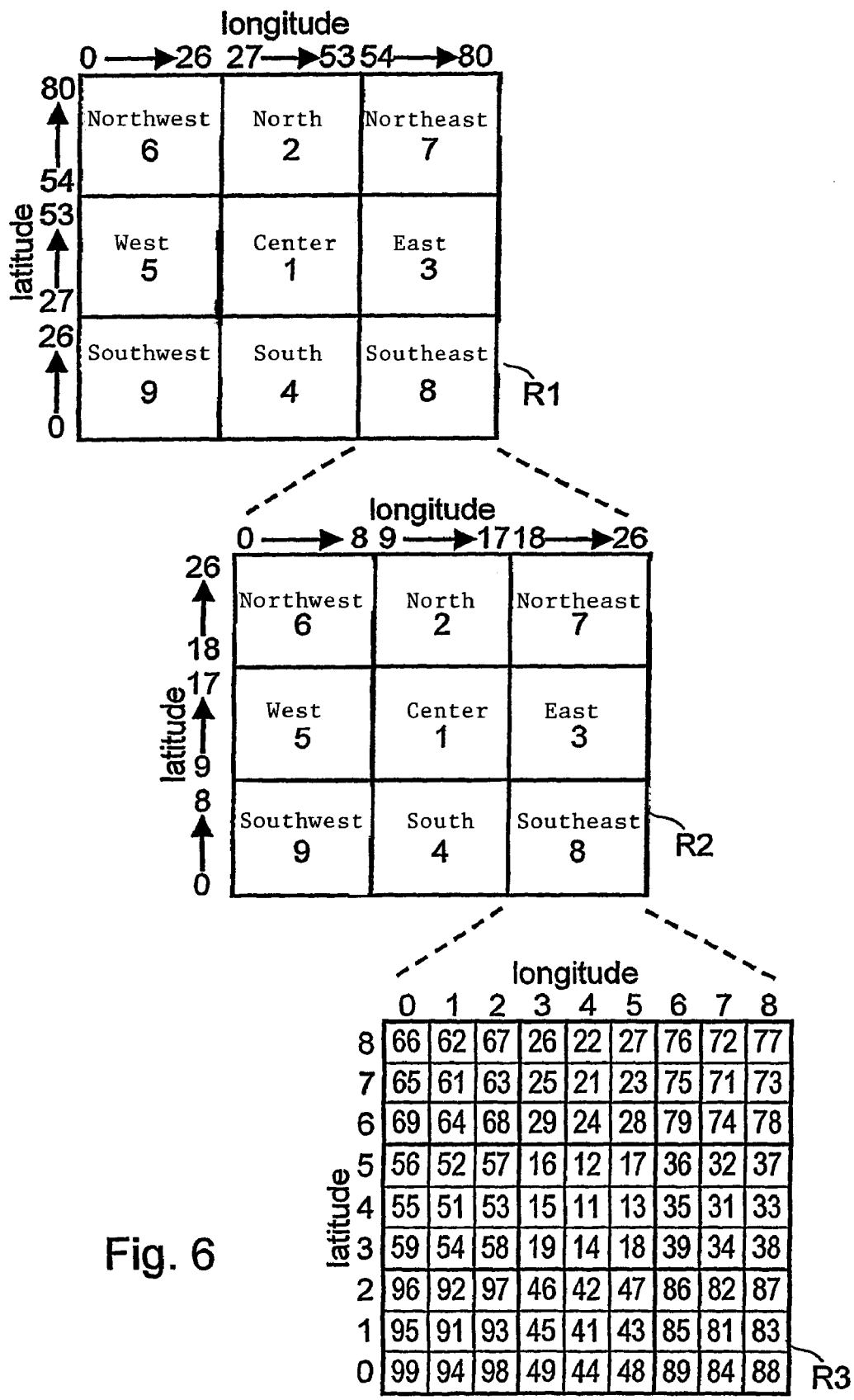
FIG. 6 represents in exploded form the division of the surface of a zone into 6561 zones (10,000 in base 9) according to aspects of the invention.
Figure 7:
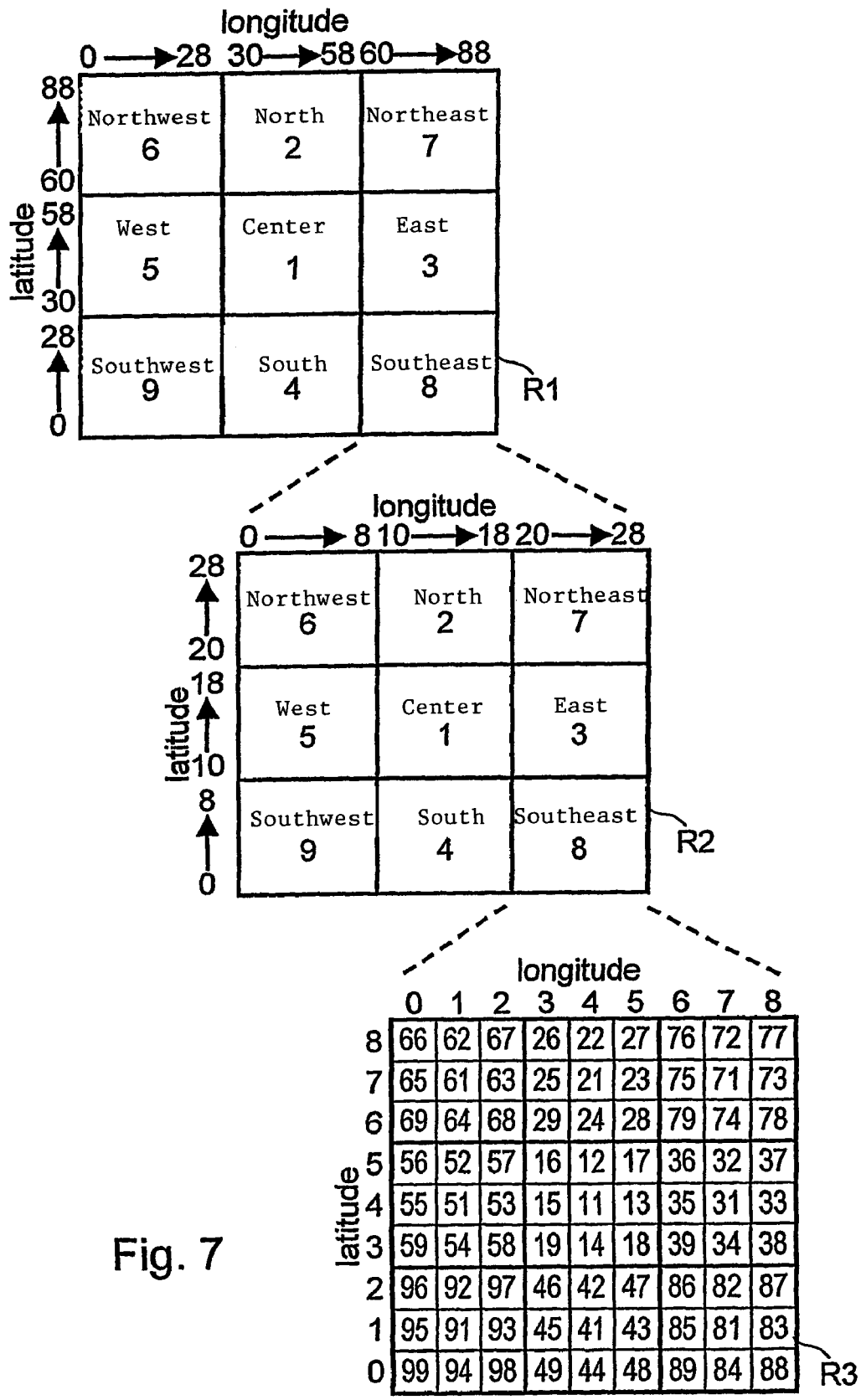
FIG. 7 is a variant of the division represented in FIG. 6 in which the coordinates are indicated in base 9.

This numbering is shown in FIGS. 6 and 7. In FIG. 6, is represented in a first rectangle R1, the division of each of the zones of first rank into 9 zones of second rank and the numbering in base 10 from 0 to 80 of the latitudes and longitudes from the South to the North and from the West to the East. Each of the zones of second rank which comprise 27 (30 in base 9) portions of meridian and 27 portions of parallel is represented by a second rectangle R2 associated with a numbering of longitudes and latitudes going from 0 to 26. Depending on the position of the zone of second rank in the hemisphere, these numberings from 0 to 26 can be offset by 27 or 54 (60 in base 9).

Each of the zones of third rank in the rectangle R2 is represented by the rectangle R3 divided into 9 (10 in base 9) zones of fourth rank, then into 81 (100 in base 9) zones of fifth rank, and associated with a numbering of longitude and latitude going from 0 to 8 which can be offset by 9 (10 in base 9) or 18 (20 in base 9) depending on the position of the zone of fourth rank in the zone of third rank (rectangle R2).

The numbering of the longitudes and latitudes is shown in base 9 in FIG. 7.

The number of a zone of fifth rank is obtained by associating successively the numbers of the zones of second and third ranks in which it is located in a manner such as to obtain a four-digit number. For example, the zone of fifth rank no. 58 located in the zone of third rank no. 2 which is itself located in the zone of second rank no. 3, presents number 3258. This zone of fifth rank is associated with longitude 54 (longitude of the zone of rank 5 no. 58)=65. Similarly, this zone of rank 5 is associated with latitude 27+18+3=48.

This representation is equivalent to a unique table in which each zone of the rectangle R1 is replaced by a rectangle R2 and each zone of the rectangle R2 is replaced by a rectangle R3.

According to the invention, this leads to the proposal of a new system of calculation using base 9.

This base comprises 9 digits: 0, 1, 2, 3, 4, 5, 6, 7, 8. In base 9, the digit 9 is written as 10. Similarly, 81 is written as 100.

In a general manner: any number is written in base 9:

$$X = A(n)A(n-1)A(n-2)\ldots A(2)A(1)A(0)$$
$$= A0 + 9 \times A1 + 9^2 \times A2 + 9^3 \times A3 + \ldots +$$
$$9^{n-1} \times A(n-1) + 9^n \times An.$$

The base 9 addition table (Table 2) and multiplication table (Table 3) are defined below.

TABLE 2 addition table in base 9

| + | 0 | 1 | 2 | 3 | 4 | 5 | 6 | 7 | 8 | 10 |
|---|---|---|---|---|---|---|---|---|---|----|
| 0 | 0 | 1 | 2 | 3 | 4 | 5 | 6 | 7 | 8 | 10 |
| 1 | 1 | 2 | 3 | 4 | 5 | 6 | 7 | 8 | 10 | 11 |
| 2 | 2 | 3 | 4 | 5 | 6 | 7 | 8 | 10 | 11 | 12 |
| 3 | 3 | 4 | 5 | 6 | 7 | 8 | 10 | 11 | 12 | 13 |
| 4 | 4 | 5 | 6 | 7 | 8 | 10 | 11 | 12 | 13 | 14 |
| 5 | 5 | 6 | 7 | 8 | 10 | 11 | 12 | 13 | 14 | 15 |
| 6 | 6 | 7 | 8 | 10 | 11 | 12 | 13 | 14 | 15 | 16 |
| 7 | 7 | 8 | 10 | 11 | 12 | 13 | 14 | 15 | 16 | 17 |
| 8 | 8 | 10 | 11 | 12 | 13 | 14 | 15 | 16 | 17 | 18 |
| 10 | 10 | 11 | 12 | 13 | 14 | 15 | 16 | 17 | 18 | 20 |

TABLE 3 multiplication table in base 9

| × | 0 | 1 | 2 | 3 | 4 | 5 | 6 | 7 | 8 | 10 |
|---|---|---|---|---|---|---|---|---|---|----|
| 0 | 0 | 0 | 0 | 0 | 0 | 0 | 0 | 0 | 0 | 0 |
| 1 | 0 | 1 | 2 | 3 | 4 | 5 | 6 | 7 | 8 | 10 |
| 2 | 0 | 2 | 4 | 6 | 8 | 11 | 13 | 15 | 17 | 20 |
| 3 | 0 | 3 | 6 | 10 | 13 | 16 | 20 | 23 | 26 | 30 |
| 4 | 0 | 4 | 8 | 13 | 17 | 22 | 26 | 31 | 35 | 40 |
| 5 | 0 | 5 | 11 | 16 | 22 | 27 | 33 | 38 | 44 | 50 |
| 6 | 0 | 6 | 13 | 20 | 26 | 33 | 40 | 46 | 53 | 60 |
| 7 | 0 | 7 | 15 | 23 | 31 | 38 | 46 | 54 | 62 | 70 |
| 8 | 0 | 8 | 17 | 26 | 35 | 44 | 53 | 62 | 71 | 80 |
| 10 | 0 | 10 | 20 | 30 | 40 | 50 | 60 | 70 | 80 | 100 |

The necessity of performing the mathematical operations of addition, subtraction, multiplication and division in base 9, thus, leads to the proposal of the construction and use of the computer program system enabling performance of these operations and more generally all mathematical operations in the new base nine. One particular implementation consists, for example, of a base 9 pocket calculator.

It is also possible to define computer programs and their material implementation (pocket calculator, converters) enabling performance of part or all of the mathematic operations (addition, subtraction, multiplication, division, power, logarithmic root, exponential, various functions, etc.) either in base 9 or in base 10, a specific keyboard and a double display enabling, for example, entering, reading, calculating, extracting or converting all mathematical operations simultaneously in these 2 bases or in other bases (2, 3, 5, 6, 7, 8, 9, etc.).

Figure 8:
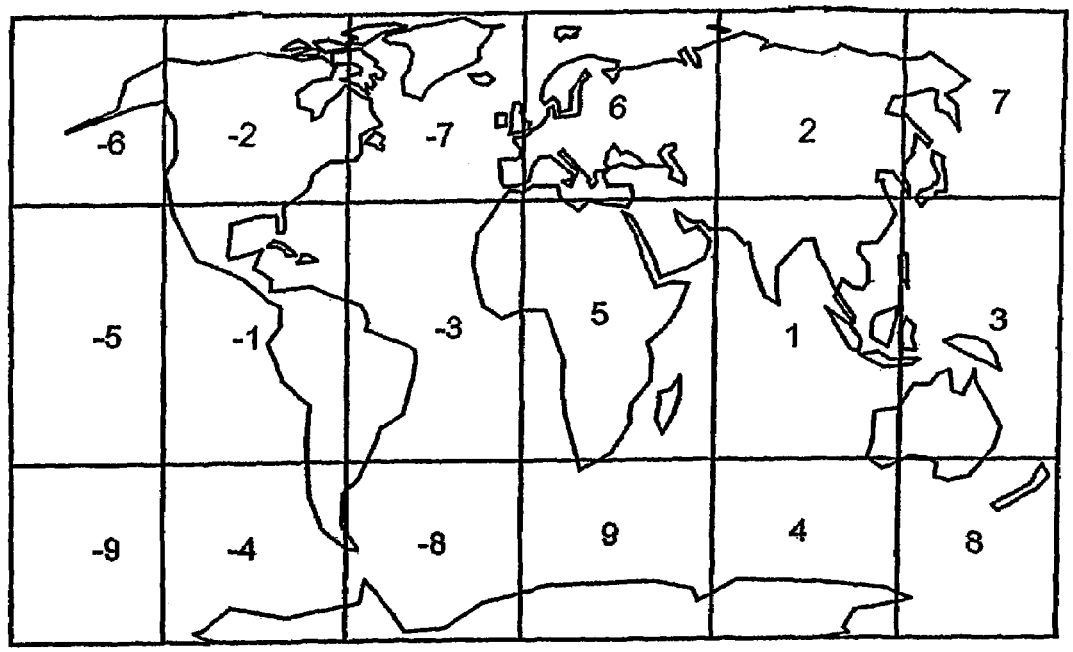
FIG. 8 represents the map of the surface of the Earth divided into zones of first rank according to aspects of the invention.
Figure 9:
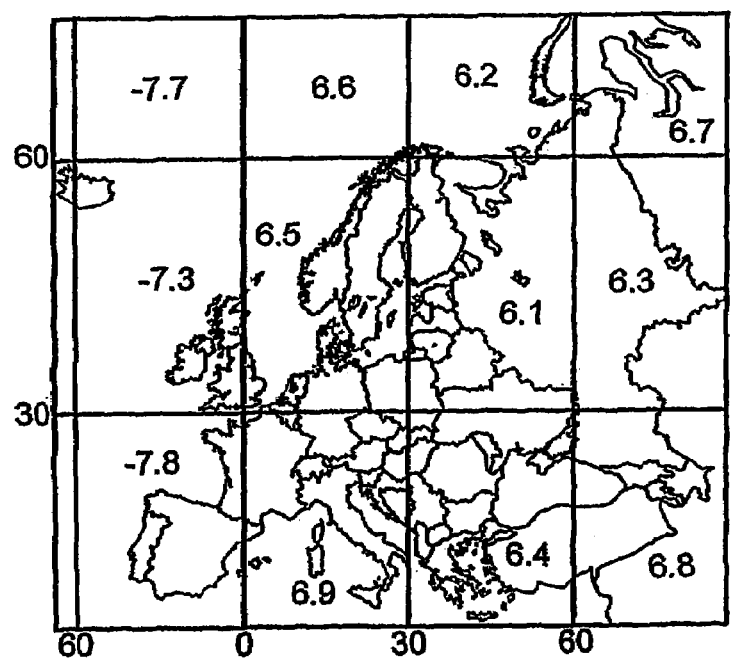
FIG. 9 represents the map of Europe divided into zones of second rank according to aspects of the invention.
Figure 10:
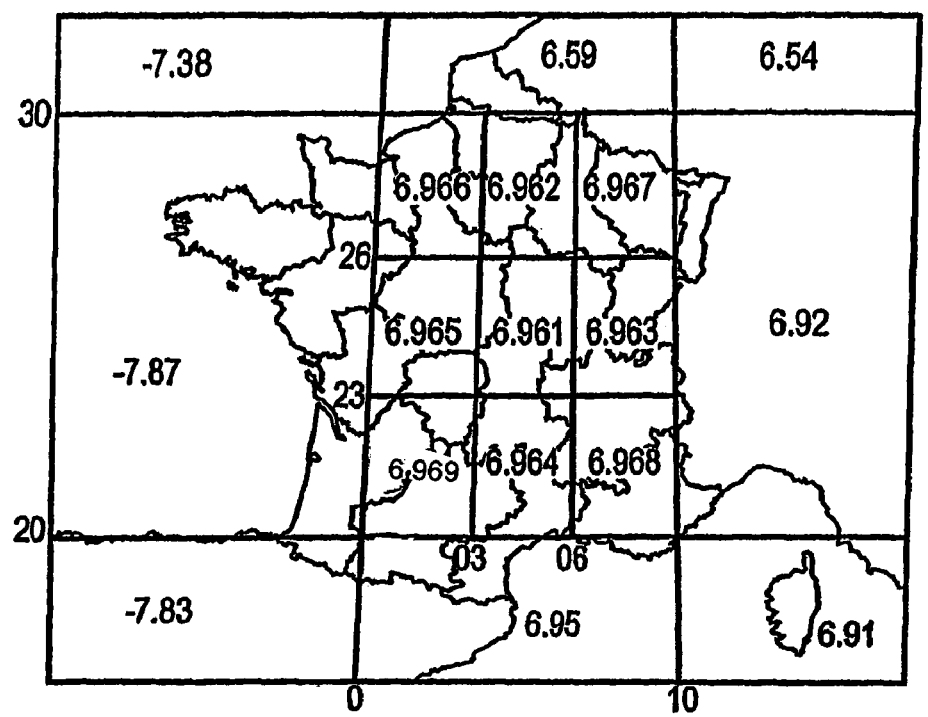
FIG. 10 represents the map of France divided into zones of fourth rank according to aspects of the invention.
Figure 11:
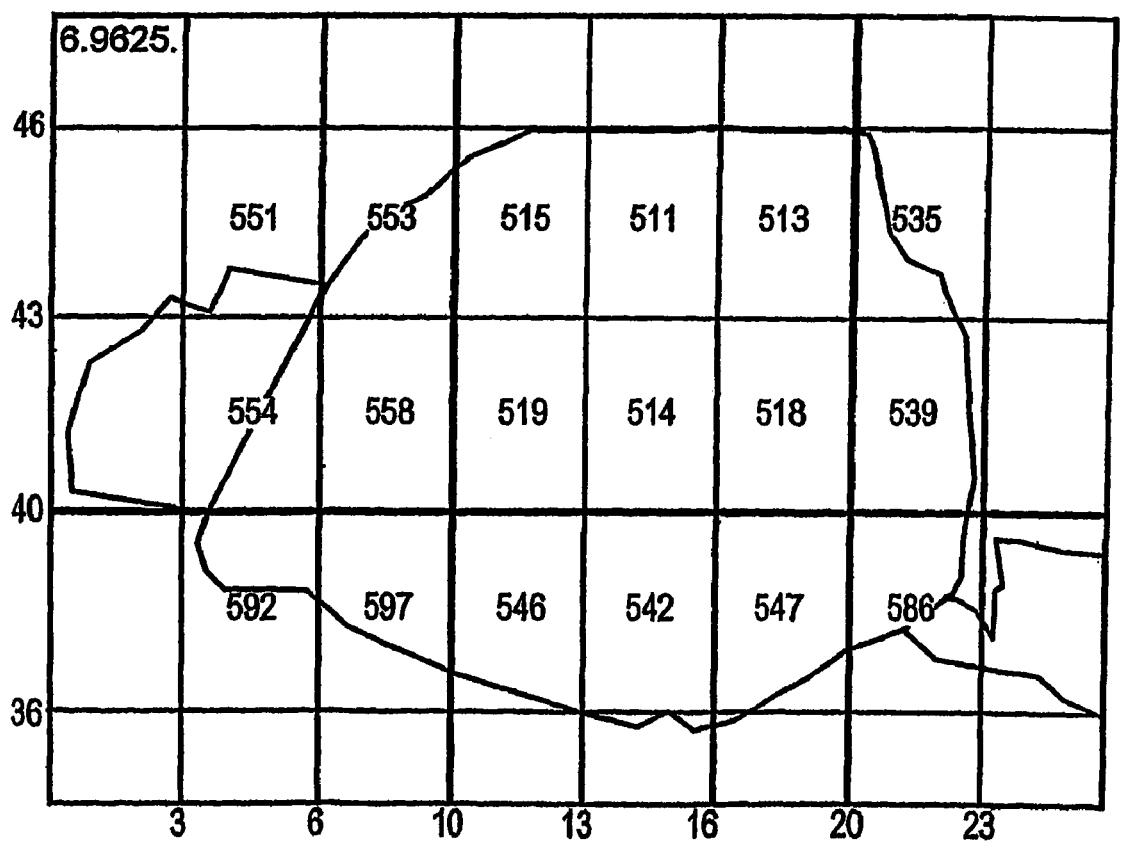
FIG. 11 represents the map of Paris divided into zones of twelfth rank according to aspects of the invention.
Figure 12:
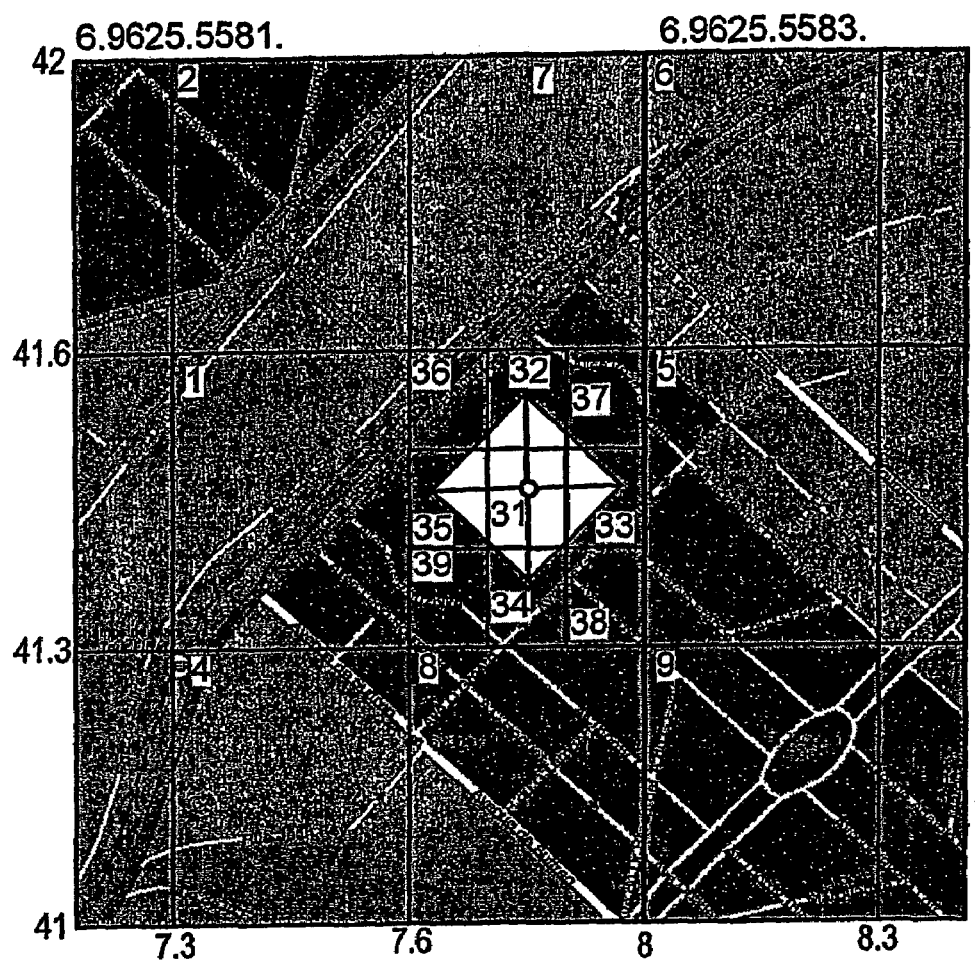
FIG. 12 represents the map of a Parisian neighborhood divided into zones of twelfth rank according to aspects of the invention.

FIGS. 8 to 12 show application of the division of the terrestrial globe into zones in accordance with the invention. As can be seen in FIG. 8, each of the zones resulting from the division of the terrestrial globe into 18 zones of first rank covers essentially a continent. Thus, zone 6 covers the major part of Europe. In FIG. 9 representing the map of Europe, the zone of second rank covers one or more countries. In that figure, the major part of France is located in zones −7.8 and 6.9. In FIG. 10 representing the map of France, the zone of third rank no. 6.96 covers the major part of France and the zones of fourth rank cover essentially a French region. In FIG. 11, the zone of sixth rank no. 6.9625.5 covers the totality of the city of Paris and a part of the suburbs. Almost the totality of the city of Paris is covered by the zones of seventh rank no. 6.9625.55, 6.9625.51 and 6.9625.53. In FIG. 12, the zone of tenth rank no. 6.9625.5581.3 encompasses the Eiffel Tower (represented by a white square in the figure). In this zone, the central zone of eleventh rank no. 6.9625.5581.31 encompasses the peak of the Eiffel Tower, zone no. 6.9625.5581.32 encompasses the North pier, zone no. 6.9625.5581.34 encompasses the South pier, zone no. 6.9625.5581.33 encompasses the East pier and zone no. 6.9615.5581.35 encompasses the West pier. Consequently, if it is desired to localize the totality of the Eiffel Tower it is necessary to use a 10-digit zone number. If it is desired to position a precise point, more digits can be used, for example 13 digits, depending on the precision desired or provided by the localization instrument employed.

To define the geographic coordinates of a point, the following units are also used:
  the grado which is the $486^{th}$ part of a circle (a circle thus comprises 486=6×81 gradoj),
  the minute which is the $81^{st}$ part of the grado (a circle thus comprises 486×81=39,366 minutoj), and
  the sekundo which is the $81^{st}$ part of the minuto (a circle thus comprises 486×81×81 =3,188,646 sekundoj).

In the present sexagesimal system, the coordinates of a point are written by indicating 2 coordinates: i.e., the longitude and the latitude, these two coordinates being expressed in degrees, minutes, second (or in grads, centigrads, milligrads). Thus, for example, the coordinates of the North pier of the Eiffel Tower in Paris are written: Longitude: East: 2° 17' 37"—Latitude: North: 48° 51' 45".

In the system according to the invention, the coordinates of a point are written by first indicating the zone number of first rank in which the point is located, then in the interior of this zone, the latitude from South to North and the longitude from West to East of this point. These coordinates are indicated in FIGS. 9 to 12. Use is also made of the symbols ° for the gradoj, ' for the minutoj and " for the sekundoj; the zone number of first rank, the longitude and the latitude are separated by commas.

Observing these conventions, the coordinates of the North pier of the Eiffel Tour are written in the following manner:
  6, 03° 07' 67", 25° 37' 49",
  or, if we group together the parts of equal precision of the longitude and latitude, separated by a dash:
  6,03-25°,07-37',67-49".

In the system according to the invention, there exists a direct bijective relation between a given geographic zone and its geographic coordinates, i.e., more precisely the longitude and the latitude of the four summits of this zone.

The geographic coordinates of a point in a given zone in the system according to the invention can be determined in three steps:

In the first step, the coordinates in the system according to the invention are determined from the coordinates in the present system in degrees, minutes, seconds. In the second step, we determine the number in grado of the level 1 base zone (rank 4). Finally, in the third step, we determine the level 2 zone (rank 8) in minuto and the level 3 zone (rank 12) in sekundo.

A graphic verification allows verification of the results of the mathematical method.

If we return to the example of the North pier of the Eiffel Tower, the transformation of the longitude in seconds yields: 2° 17' 37"=8257".

This value can be converted into sekundoj by a rule of three (60° for 81 gradoj):
  8257/216,000×531,441=20,317", i.e., 3° 07' 67"
  or in base 9: 3° 07' 74".

Similarly, the transformation into seconds of the latitude 48° 51' 45" (18° 51' 45", knowing that the origin of the new reference point is located at +30°) yields: 67,905", i.e., in sekundoj (after application of the rule of three): 167,071", i.e., 25° 37' 49", or in base 9: 27° 41' 54".

It is then necessary to transform in base 3 the coordinates in new base of the longitude and latitude. Thus, in base 3 the longitude of 1° becomes 0001 and the latitude of 27° becomes 1000.

The base change matrix below is then used:

|   | 0 | 1 | 2 |
|---|---|---|---|
| 2 | 6 | 2 | 7 |
| 1 | 5 | 1 | 3 |
| 0 | 9 | 4 | 8 |

From this matrix, we can determine for each coordinates couple in base 3, the number of the corresponding zone:
  the pair (0,1) is associated with the digit of zone 5, the pair (0,0) is associated with the digit 9 and the pair (1,0) is associated with the digit 4. Thus, the number of the level 1 zone of the Eiffel Tower is 9625, this being in the zone of rank 1 no. 6.

In order to determine level 2 (minutoj) and level 3 (sekundoj) zone numbers, the same procedure is followed in transforming the minutes (74 and 05) and the seconds (17 and 20) in base 3.

In base 3, 74 becomes 2202; 05 becomes 0012; 27 becomes 1000 and 20 becomes 0202.

Using the same passage matrix, we obtain the following zones:
  Zone 2 (minutoj): 5581 and zone 3 (sekundoj): 3211.

It is very easy to verify the three zone numbers of levels 1, 2 and 3 found by means of the tables represented in FIG. 6, yielding a zone number as a function of a longitude and latitude number.

Thus, in this figure, "03-25" (03=0+0+3–25=0+18+7) corresponds to zone 25 of fifth rank in zone 6 of third rank in zone 9 of second rank, i.e., zone 9625. Similarly, "07-37" (07=0+0+7–37=27+9+1) corresponds to zone 81 in zone no. 5 of rank 3 in zone 5 of rank 2, i.e., zone no. 5581. Similarly, "67-49" corresponds to zone 3211.

In the new system of coordinates, the North pier of the Eiffel tower is located in the third level zone (13th rank) defined in the following manner:

6,9625,5581,3211

Inversely, to determine the geographic coordinates of a point from its zone number, the 3 steps below are performed:

In the first step, there is performed a change of base number in 2 dimensions for the codification of the zones. In the second step, the coordinates are converted into base 3, then in the third step the coordinates are determined in base 81 in the interior of each zone.

If this method is applied to the example of the North pier of the Eiffel Tower, we calculate the longitude and latitude of level 1. For this purpose, we perform a change of numeric base in 2 dimensions for the codification of the zones. The base change table 1 is used for this, but in the opposite direction.

This table gives for the digits 9625: 9=(0,0); 6=(0,2), 2=(1,2) and 5=(0,1). We then perform a change of numeric base in 2 dimensions for the codification of the zones. We thereby obtain the digits x=0010 and y=0221.

We then determine the coordinates in base 9 in the interior of each zone. We thereby obtain the digits x=0010=3 and y=0221=25, in base 9.

The coordinates of level 1 in base 9 are thus 03-25.

For the longitudes and latitudes of levels 2 and 3, the same method is implemented with the numbers 5581 (minutoj) and 3211 (sekundoj).

According to table 1, 5=(0,1); 8=(2,0) and 1=(1,1), which yields the digits x=0021=07 in base 9 and y=1101=37 in base 9. Thus, we have the coordinates 07-37 for the minutoj.

For 3211 sekundoj, we have 3=(2,1); 2=(1,2) and 1=(1,1). We thereby obtain the digits x=2111=67 in base 9 and y=1211=49 in base 9, which yields the coordinates 67-49 in sekundoj.

These values of longitude and latitude can easily be verified by means of FIG. 6, by referencing the zone numbers then determining the corresponding longitudes and latitudes.

A graphical verification using a table of 81 rows and 81 columns is also very easy to perform.

We, thus, find the preceding geographic coordinates of the North pier of the Eiffel Tower.

The system of geographic coordinates according to the invention can also be expressed in base 9.

The Earth is in fact represented by an ellipsoid whose most recent international definition is the ellipsoid called WGS 84.

Its physical characteristics are the following:

Great half axis: a=6,378,137.0 m

Flattening: f=1/298,257,223,563

Radius of the sphere having the same volume as the Earth: R=6,371,000.8 m.

We can determine the half circumference of this sphere and all of the arcs of this sphere along a meridian which has 3 divisors. Thus, we note the new unit: the "metro" whose value is:

1 metro=1.394885987 m.

Thus we define the "metro", new unit of length measurement, as being the half perimeter of the sphere equivalent to the terrestrial sphere divided 15 times by 3.

The submultiples of the metro are in base 9 with the same notations as in the decimal system:

1 decimetro=15.4987332 cm 1 centimetro=1.7220815 cm 1 millimetro=1.913424 mm, etc.

There are triple advantages to this solution and this new scale of units of length:

1) Unlike the present meter, the scale is not arbitrary.

2) Each measurement unit is a divisor or multiple of 3 (and no longer of 10) of the preceding unit.

3) The grado represents at the surface of the theoretical sphere defined in this manner a measurement of 100 kmo (82.37 km), the minuto a measurement of 1 kmo (1.016 m) and the sekundo a measurement of 10 metroj (12.55 m).

The table below expresses the arcs and the corresponding measurements both in base 10 (using the meter as the unit) and in base 9 with new measurement units based on successive divisions by 3 of the half perimeter of the Earth.

TABLE 4

| A Radius | B b(9) | C 6,371,000.8 | D m | E Units | F New units | G Q | H Arc of angle |
|---|---|---|---|---|---|---|---|
| Hemisphere | 0 | 20,015,089.31 | m | 30,000,000 | | 300 | |
| 1 | 1 | 6,671,696.44 | m | 10,000,000 | | 100 | |
| 2 | 2 | 2,223,898.81 | m | 3,000,000 | | 30 | |
| 3 | 3 | 741,229.60 | m | 1,000,000 | megametro | 10 | |
| 4 | 4 | 247,099.87 | m | 300,000 | | 3 | |
| 5 | 5 | 82,366.62 | m | 100,000 | | 1 | grado |
| 6 | 6 | 27,466.54 | m | 30,000 | | 30 | |
| 7 | 7 | 9151.85 | m | 10,000 | | 10 | |
| 8 | 8 | 3,050.62 | m | 3,000 | | 3 | |
| 9 | 10 | 1,016.87 | m | 1,000 | kilometro | 1 | minuto |
| 10 | 11 | 338.9572949 | m | 300 | | 30 | |
| 11 | 12 | 112.985765 | m | 100 | hectometro | 10 | |
| 12 | 13 | 37.66192166 | m | 30 | | 3 | |
| 13 | 14 | 12.55397389 | m | 10 | decametro | 1 | sekundo |
| 14 | 15 | 4.184657962 | m | 3 | | 30 | |
| 15 | 16 | 1.394885987 | m | 1 | metro | 10 | |
| 16 | 17 | 0.464961996 | m | 0.3 | | 3 | |
| 17 | 18 | 0.154987332 | m | 0.1 | decimetro | 1 | sekuntrio |

TABLE 4-continued

| A Radius | B b(9) | C 6,371,000.8 | D m | E Units | F New units | G Q | H Arc of angle |
|---|---|---|---|---|---|---|---|
| 18 | 20 | 0.051662444 | m | 0.03 | | 30 | |
| 19 | 21 | 0.017220815 | m | 0.01 | centimetro | 10 | |
| 20 | 22 | 0.005740272 | m | 0.003 | | 3 | |
| 21 | 23 | 0.001913424 | m | 0.001 | millimetro | 1 | sekunkvaro |
| 22 | 24 | 0.000637808 | m | 0.0003 | | 30 | |
| 23 | 25 | 0.000212603 | m | 0.0001 | | 10 | |
| 24 | 26 | 0.000070868 | m | 0.00003 | | 3 | |
| 25 | 27 | 0.000023623 | m | 0.00001 | | 1 | sekunkvino |
| 26 | 28 | 0.000007874 | m | 0.000003 | | 30 | |
| 27 | 30 | 0.000002625 | m | 0.000001 | micrometro | 10 | |

As a concrete, material application, it is possible to create measurement instruments graduated according to the new units. It is, thus, possible to provide a ruler graduated in millimetroj in base 9 and a dual ruler graduated on one side according to the decimal system and on the other side according to the system in base 9 according to the invention. It is also possible to provide electronic telemeters which indicate the measurements of length according to these units defined in base 9, or from the metro as defined above, or even, where applicable, from the present meter subdivided itself in base 9.

It is then easy to telemeter the indicator of the relative and successive divisors by 3 of a given length and to indicate their correspondence in new (metroj) or old units of measurement (meters).

The system according to the invention can also apply to position referencing in space, either in considering volumes divided into 27 (or powers of 27) zones and in numbering each zone from 1 to 27, or in associating with the position referencing on a surface, the third dimension in the form of a measurement in base 3.

It is also possible to combine the division of a surface described in reference with FIGS. 5 and 6 with the division of a disk described in reference with FIG. 4, the South-North axis of the Earth corresponding to the 0–300 gradoj axis of the disk of FIG. 4.

It can readily be understood that reference positioning by zone number makes it possible to take into account the precision of the measurement (the more precise the measurement, the smaller the zone and thus the more digits that the zone comprises), as well as the dimension of the object to be referenced. This position referencing mode does not have an equivalent in the present system which, for referencing a zone, requires the definition of the geographic coordinates of each point delimiting the zone, or the definition of the center of the zone and a radius in the case of a circular zone. Consequently, simply stating a zone number provides an indication on the precision of the localization which is given by the number of digits in the zone number.

The applications of this invention cover notably the definition and the fabrication of new geographic maps (world, continent, country, region, city, neighborhood, field, construction plan, apartment complexes, houses, apartments, etc.) containing both coordinates in longitude and latitude, but also the possible codification of all parts of the map, irrespective of the scale of the map (from $1/50,000,000$ for the Earth to $1/10$ for an office or a room in a house or apartment, for example).

Divisors of 9 rather than divisors of 10 are used for the scales of maps, but their specification in base 9 can be written following the same rules ($1/1,000,000^{th}$, $1/1,000,000^{th}$ or $1/1000^{th}$, for example.

This invention also makes it possible to define a unique geographic address for each point or site of the Earth or any other sphere. Thus, for example, the buildings and streets of cities can be associated with a 14-digit number indicating their exact position in the world within approximately 10 m. This number can advantageously be displayed on street signs or on houses and buildings.

This number can be used as a supplement to the existing codes (postal code, Internet address, etc.).

This invention also pertains to a converter of geographic coordinates presented in the form of a pocket calculator or an equivalent device, into which one enters present geographic coordinates (longitude and latitude) to automatically obtain the new coordinates in base 9 and a corresponding zone number calculated by the converter.

Such a converter can also be designed to perform the inverse calculations as well (old-style coordinates in longitude and latitude either from coordinates in base 9, or from a zone number).

It is also advantageously designed for converting numbers in base 10 into numbers in base 9 and vice versa, as well as for performing mathematical operations in bases 9 and 10.

This invention also pertains to new instruments for measuring distances or dimensions (rulers, sliding calipers, etc.) based on the new measurements in base 3 and 9, and no longer in the metric system. The invention also pertains to new instruments for measuring angles (protractors, compasses, etc.) based on a circle divided into 600 gradoj (486 in base 10), rather than degrees, minutes and seconds, or in grads, decigrads, centigrads.

The invention also pertains to new devices for the terrestrial, aerial or maritime position referencing of different objects (GPS, ground or launched radar, sonar devices, etc.), devices that can be used for the position referencing of angles in gradoj and their divisions.

The invention can also be applied to aerial, maritime or terrestrial navigation by the construction of new onboard instruments of vehicles or construction equipment, and new navigation instruments (compasses, stereographs, binoculars, geodesic devices, bathyscaphs, etc.).

Figure 13:
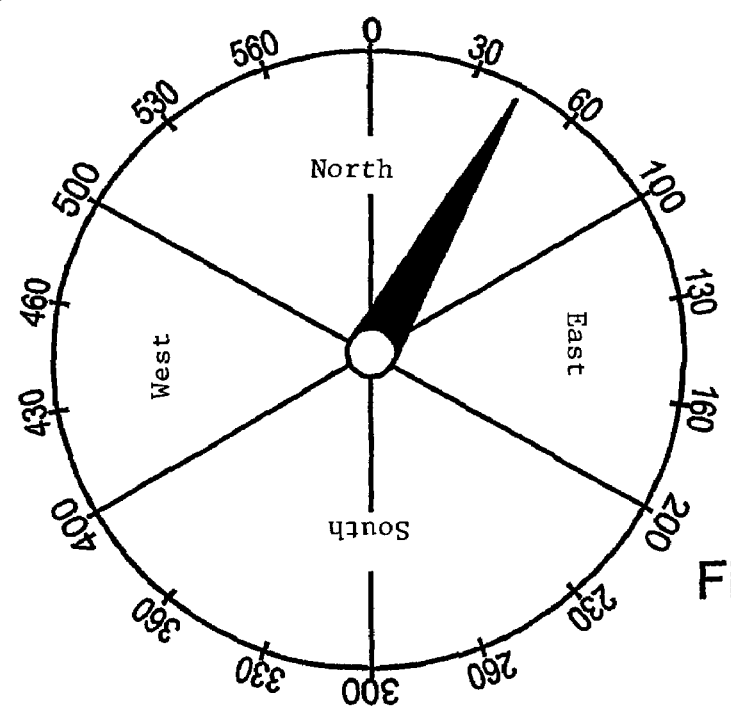
FIG. 13 represents a compass adapted to the division of a circle into 486 sectors (600 in base 9) according to aspects of the invention.

FIG. 13 represents such a compass comprising 486 graduations numbered from 0 to 600 in base 9.

The invention also pertains to a GPS ("Global Positioning System") receiver or equivalent, or mobile telephone (GSM or UMTS network), making it possible to obtain localization information in relation to the Earth with a precision chosen by the user, within the limit provided by the localization system (from 7 to 15 digits initially for the zone number) and to place the object on a map by means of the zone number and/or coordinates (longitude and latitude) in base 9 according to the invention.

Figure 14:
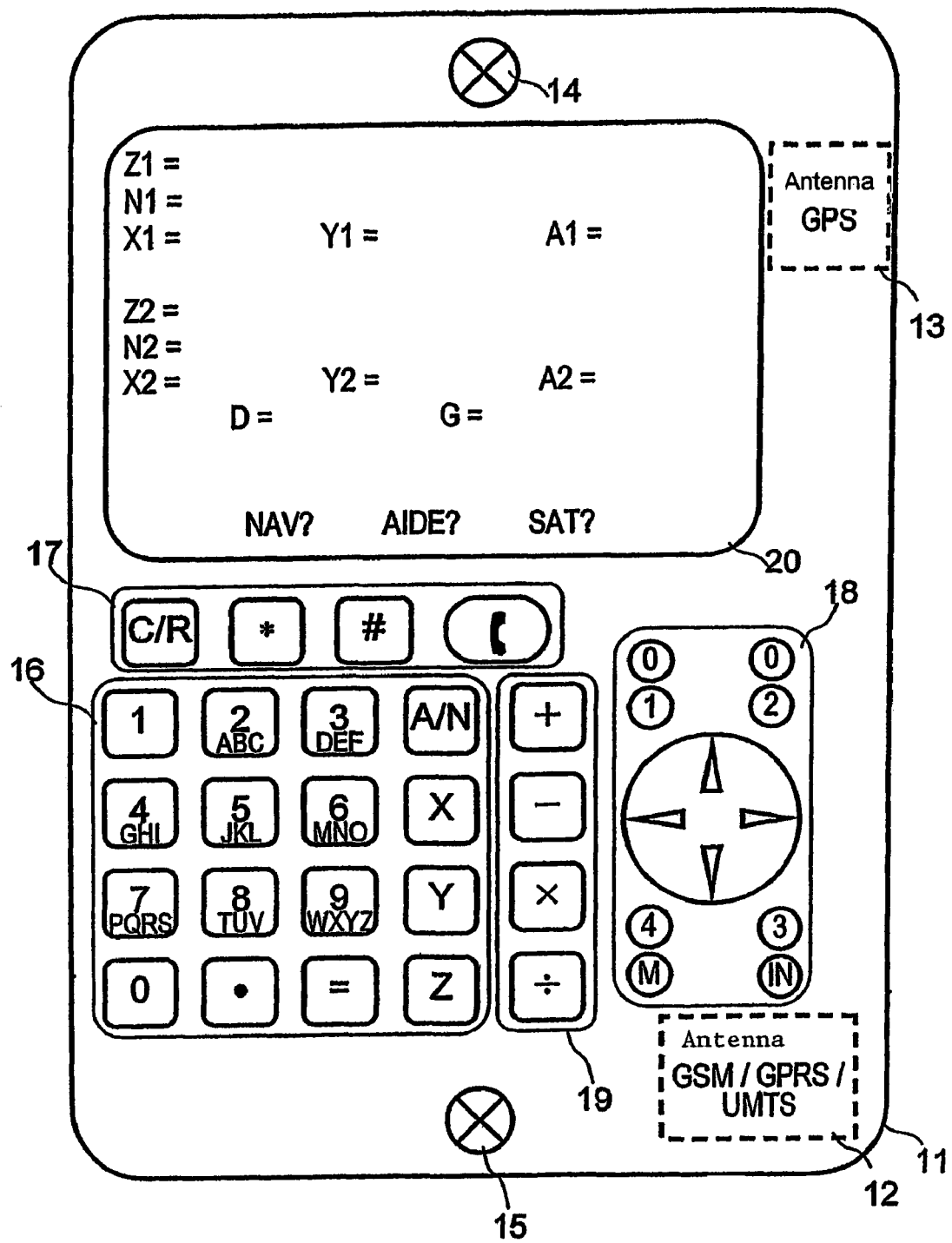
FIG. 14 represents a geographic localization device according to aspects of the invention.

An example of such an instrument is represented in FIG. 14. The device 11 represented in this figure combines the functions of satellite localization receiver of the GPS type, mobile telephone and calculator. To provide the functionality of a mobile telephone, it comprises notably a microphone 15, a speaker 14, a display screen 20, an alphanumeric keyboard 16, a set 17 of control keys specific to the telephonic operations and an adapted antenna 12. To provide the functionality of satellite localization receiver, it also comprises an antenna 13 which can be the same antenna as the one used for the mobile telephone operations, and a set 18 of control keys for the localization function. To be able to provide the calculator functionality, it also has a set 19 of selection keys for arithmetic operations.

The assembly of these elements is in a conventional manner controlled by a microprocessor and powered by a battery (not shown).

These elements are in particular controlled to be able to introduce, determine, display and store in memory the coordinates (Z, X, Y, A) of geographic sites, these coordinates comprising according to the invention a zone number Z, a longitude X, a latitude Y and an altitude A, as well as a literal N designating the site in question, which the user can introduce by means of the alphanumeric keyboard 16. In particular the display mechanism allows display of the geographic coordinates and literals of two geographic sites, of calculating their distance D and the orientation G of the second site in relation to the first.

It is also possible to design the calculator function to perform conversion calculations between the international system and the system according to the invention. The device 11 can moreover be designed to allow the user to select the coordinate system used for displaying the position of sites stored in memory or determined by the localization receiver.

The invention can also be applied to the instruments used in localization in space such as astronomical telescopes and telescopes, as well as machines using a system of X, Y, Z coordinates, such as the machine tools for fabricating and machining parts, precision instruments (microscopes, electron microscopes, etc.), medical instruments such as the devices used in medical imaging (scanners MRI, radiographs) or those devices whose positioning in controlled by a machine, such as the instruments using a radiation source which most be focalized on a precise site of the body to be treated.

Figure 15:
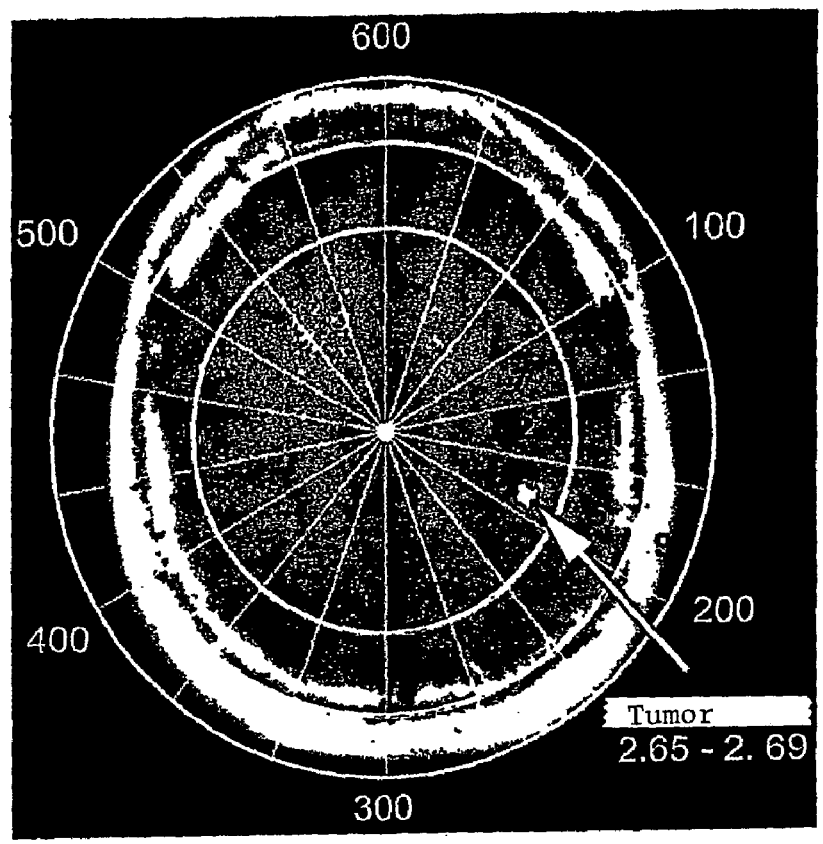
FIGS. 15 and 16 are tomographic views of a human skull in a longitudinal plane and in a transverse plane, respectively.
Figure 16:
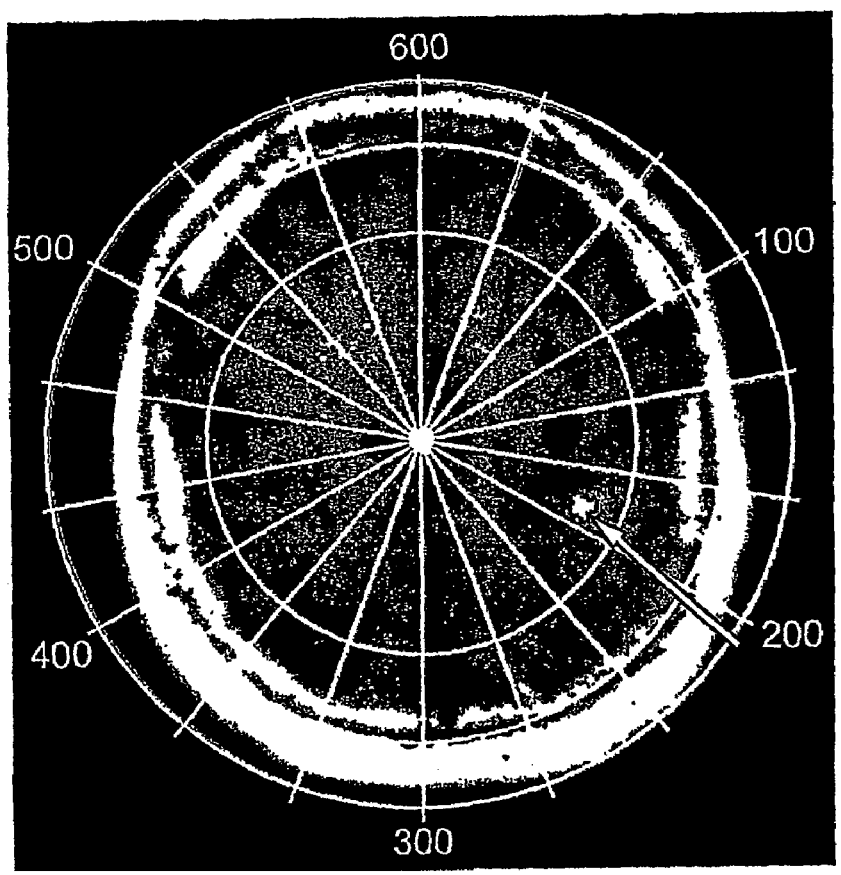

Thus, FIGS. 15 and 16 show tomographic images of the human brain, FIG. 15 being a sectional view of the brain in a plane parallel to the face (plane passing through the longitudinal axis of the human body) and FIG. 16 being a sectional view in the plane perpendicular to the longitudinal axis. On these images was superposed a cut-out of a circular surface (elliptic in FIG. 15) in zones, such as represented in FIG. 4, to localize a tumor to be treated. In FIGS. 15 and 16, this tumor is localized in the zone numbered 2.65 and 2.69. As can be seen in these figures, the size of the ellipsoid which is used for localizing the tumor is adapted to the size of the brain to be treated.

In relation to the present techniques which consist of using a Cartesian referencing system and dividing the volume of the brain into elementary volumes, called voxels, corresponding to an elementary square for a given thickness of sectional plane (for example, a side of 1 mm), the division technique according to the invention makes it possible to precisely establish the reference position of a zone by a limited number of digits.

This technique can also be applied to image analysis, such as images of digital fingerprints or irises, currently used for the identification of people. In this case also, the division of the image as described in reference with FIG. 4 or 6 is adapted to the size of the image to be analyzed, as is the number of levels of subdivisions which is adapted to the number of pixels of the image to be analyzed.

More generally, the localization technique according to the invention can be applied to a computer screen display or to a zone of such a display, such as a window. It can also be used in any computer-assisted publication or drawing program (PAQ or DAO).

Generally speaking, the invention is applicable to any computer program or material device whether it be scientific or technical of industrial, professional or domestic use in which measurements or position referencing of angles can be performed usefully using gradoj and their divisors.

We have, thus, defined a localization system defining the position of a zone or an object by a single number without decimals, the number of digits in the number being larger when the dimensions of the zone are smaller, as a function of the precision required.

Moreover, it should be noted that the division of the surface of Earth into zones, as represented in FIGS. 5 and 8, causes a division of the Earth into 18 hourly lunes (corresponding to the number of lunes in the zone division of second rank). It is, thus, desirable to divide the terrestrial day into 18 new hours, and to apply the division in base 9 according to the invention.

The invention, thus, also pertains to the construction of new instruments for measuring time (watches, clocks, chronometers, etc.) using a system of 18 new hours, 81 new minutes, 81 new seconds.

For units of time a day is now divided into 24 hours of 60 minutes, each minute containing 60 seconds. The day is, thus, comprised of 86,400 seconds.

According to the invention, to attain notably harmony with the longitudes we divide in base 10 the day into 18 hours of 81 minutes each containing 81 seconds which, in base 9, indicates that a day comprises 20 horoj of 100 minutoj, with each minuto containing 100 sekundoj.

We, thus, have the table below for passage from the old hours to the new hours in which all of the divisions are multiples of 81 (100 in base 9).

The new unit of time in this new system is called the "sekundo" with the following definitions:

One day comprises 20 horoj in base 9 (18 horoj in base 10), each horo comprising 100 "minutoj" (81 minutoj in base 10) and each minuto comprising 100 "sekundoj" (81 sekundoj in base 9).

This means that 86,400 seconds of today represent 200,000 sekundoj in the new time system (118,098 sekundoj in base 10).

In terms of objective duration of time, 86,400 old seconds, thus, represent 118,098 new sekundoj, i.e., one sekundo is equivalent to 86,400/118,089=0.73165155 seconds or inversely that one second is equivalent to 118,089/86,400=1.36677083 sekundo.

The new time measurement unit (the sekundo) is, thus, approximately 36% more precise than the old unit (the second), the minuto being almost equivalent to the minute (1.458 minutoj is equivalent to 1,440 seconds), whereas one horo (new hour) is longer by 33% than an old hour (18 horoj are equivalent to 24 hours, i.e., one horo is equivalent to one hour and 20 minutes).

In contrast, we can see the harmony of all of the submultiples of the hour which are all equivalent to ⅟₁₀₀ (in base 9) of the preceding unit).

| Day | Hours/minutes/seconds | Horoj (base 10) | Horoj (base 9) |
|---|---|---|---|
| 1st level | 24 hours | 18 horoj | 20 horoj |
| 2nd level | 1440 minutes | 1458 minutoj | 2000 minutoj |
| 3rd level | 86,400 seconds | 118,098 sekundoj | 2000,000 sekundoj |
| 4th level | 8,8640,000 1/100 second | 9,565,938 sekuntrioj | 20,000,000 sekuntrioj |

The hour dial of the new watches is divided into 20 hours (18 hours in base 10), whereas the minute and second dials are graduated by 100 in base 9.

The days, horoj, minutoj and sekundoj are always divisible by 3.

The submultiples of the sekundo are defined like the submultiples of the sekundoj of angles (sekuntrioj, sekunkvaroj, sekunkvinoj, etc.).

To establish the reference position in space or on the surface of a sphere of radius R, one determines a central point origin of the coordinates and a reference axis of the sphere often oriented from bottom to top like its axis of rotation.

This axis is, according to figure [_] the axis AOB centered on 0.

We then define the coordinates of the point M of the space by 3 data:
1) The longitude theta defined by the angle theta (HMO, HM) between the vertical plane AOR passing though the reference axis and the reference point R set as origin of the longitudes (Greenwich for the Earth) and the vertical plane passing through the point M.
   This longitude is defined in gradoj and it is measured positively from west to east from the plane passing through the meridian of origin.
   The longitude ranges always positively from 0 to 600 gradoj.
2) The latitude phi defined by the angle of the plane MOA between the vertical axis OA and the vector OM of this plane.
   The latitude is counted positively in gradoj from the axis OA from bottom to top.
   The latitude ranges always positively from 0 to 300 gradoj.
3) The distance R=OM between the point M and the origin of the coordinates (which for the Earth is the center of the sphere).

It can be seen that these definitions combined with the numbering of the sphere into 18 zones makes it possible, in harmony with the definition and the analysis of the new measurements of time in sekundoj, to define new geographic and time localizer devices which provide at any point of space a local solar time in addition to a time defined by the new time zones.

In fact, the sun revolves around the Earth in 200,000 sekundoj, i.e., it crosses 600 geographic gradoj or 60,000 geographic minutoj in 200,000 sekundoj.

Thus, at the equator, the sun covers 1 minuto of arc (1.016 m) in 3 sekundoj.

We can see here the harmony between the measurement of the 3 units of length, arc and time which are all expressed in base 9.

For the numbering of the interior of a sphere, one determines similarly in the space the radii of the sphere representing the radius of the sphere divided by the cubic root of 3. The numberings of the interior zones of the sphere are implemented along 3 elementary vectors Ox, Oy and Oz, the first 2 of which Ox and Oy are tangent to the sphere at a point M and the $3^{rd}$ of which Oz is perpendicular to the sphere.

The numberings of the interior zones of the sphere are, thus, performed from the numberings already performed for the surface of the sphere by adding 2 digits translating the measurements in base 9 of the angles phi and theta expressed in gradoj.

It can be understood that under these conditions, the number of each of the new hour zones 18 corresponds to the hourly offset in new hours of the time zone in relation to the meridian of origin.

Figure 17:
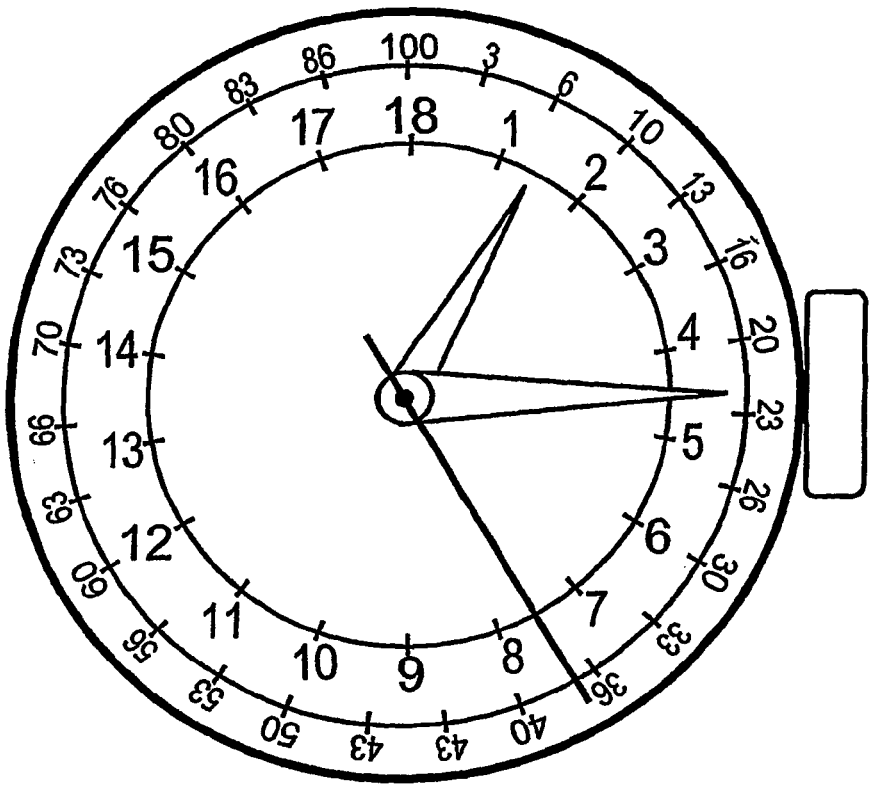
FIG. 17 represents a watch or a clock adapted to the cutting up of the Earth into 18 lunes.
Figure 18:
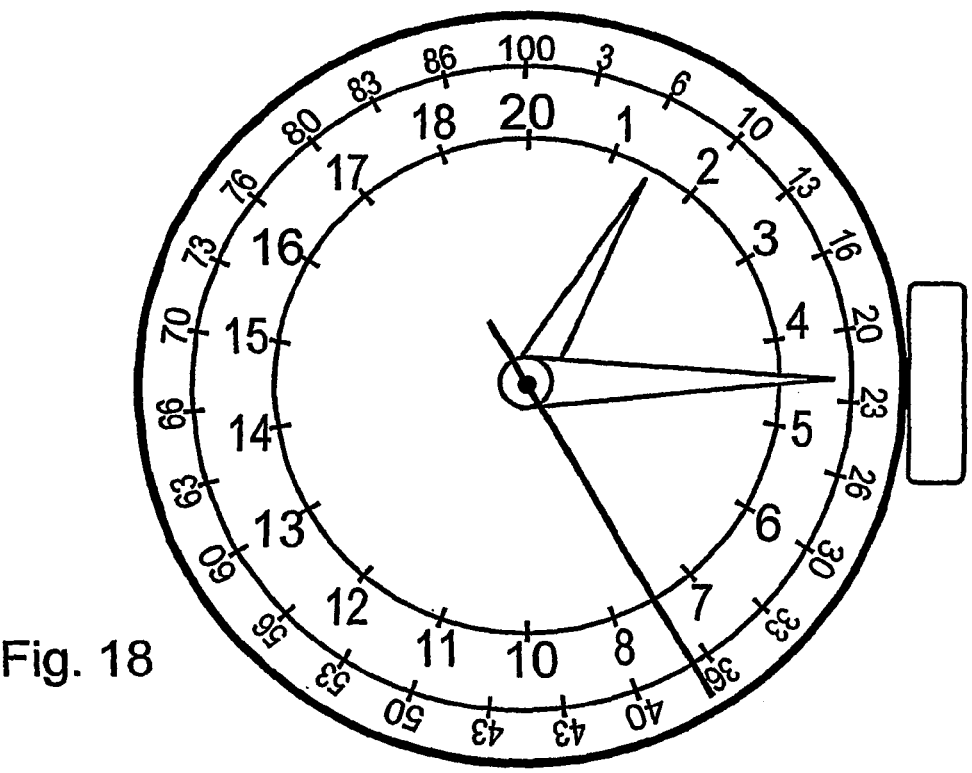
FIG. 18 illustrates a variant of the clock or watch represented in FIG. 17 in which the hours are indicated in base 9.

The dial of a watch or a clock according to the invention is represented in FIGS. 17 and 18. In these figures the dial is subdivided into 18 new hours, each new hour being divided into 81 new minutes, or 100 new minutes in base 9, each new minute being divided into 81 new seconds (100 in base 9). FIG. 18 shows the numbering of the hours in base 9.

This system can furthermore be generalized to any other measurement instrument, such as instruments for the measurement of weight (balances, scales, etc.) using base 3 or 9.

The invention claimed is:

1. A system for localizing an area in space in relation to a predetermined point on a surface of circular form, wherein the surface is divided into six equal main sectors, each sector being divided into three equal sectors and by two circles centered on the center of the surface so as to obtain nine zones of a first rank, each zone of a rank n, n being an integer number greater than 1, being divided successively in a same manner into nine zones of higher rank n+1, a predetermined respective number from 1 to 6 being attributed to each of said six main sectors, a predetermined respective number from 1 to 9 being attributed to each of the zones of first rank and to each of the zones of rank n+1 in the zone of rank n, a zone of rank n being localized by a zone reference sequence having n+1 digits containing the number of said zone, the respective numbers of all of zones of lower ranks n−1 to 1, and the number of the main sector, in which said zone is located, said system comprising:

means for detenniing the zone reference sequence of a zone of rank n in which is located an area to be localized in the surface, n being the maximum value such that the surface of the area to be localized is included in said zone of rank n, and means for manipulating said zone reference sequence.

2. The system according to claim 1, wherein the zone division circles have radii selected such that the zones of a same rank n have a same surface measurement.

3. The system according to claim 1, wherein the zone division circles have radii selected such that the zones of rank n have a constant radial width.

4. A system for localizing an area in space in relation to a predetermined point on an essentially spherical surface, an area to be localized being localized in relation to a predetermined meridian of the spherical surface, the spherical surface being divided into two hemispherical zones by a radial plane passing through a meridian selected as reference, each hemispherical zone being divided into three identical spherical sectors by two radial planes each including a respective meridian, and each of the three spherical sectors by two planes perpendicular to the radial planes each including a respective parallel, so as to obtain nine zones of a first rank, each zone of a rank n being successively divided in a same manner into nine zones of higher rank n+1, n being an integer number greater than 1, a predetermined respective number from 1 to 9 being attributed to each of the nine zones of first rank and to each of the zones of rank n+1 in the zone of rank n, and a zone of rank n being localized by a zone reference sequence having n digits containing the number of said zone, and the respective numbers of all of zones of lower rank n−1 to 1, in which said zone is located, said system comprising:

means for determining the zone reference sequence of a zone of rank n in which is located an area to be localized in the surface, n being the maximum value such that the surface of the area to be localized is included in said zone of rank n, and means for manipulating said zone reference sequence.

5. The system according to claim 4, wherein the spherical surface is the surface of a terrestrial globe.

6. The system according to claim 4 or 5, further comprising in order to localize an area in space, means for determining a cone in which is located said area in space, said cone having for its center, the center of the spherical surface, and for its directrix curve, the contour of one of said zones of rank n, n being the maximum value such that the area to be localized is included in said cone.

7. The system according to claim 4, further comprising means for associating with all fixed or mobile elements in relation to the sphere the zone referencing sequence of the zone of rank n in which said element is located.

8. The system according to claim 4, further comprising means for converting a zone reference sequence into at least two coordinates respectively according to a meridian and a parallel of the spherical surface, in relation to a point selected as origin and vice versa.

9. The system according to claim 4, further comprising at least one device comprising reception means for receiving localization signals, calculation means for determining a zone reference sequence of a zone of rank n in which the device is located, the rank n being selected to correspond to the precision of the localization signals.

10. The system according to claim 9, wherein the localization signals are transmitted by satellites in orbit around a terrestrial globe.

11. The system according to claim 9, wherein said device is a cellular telephone network terminal comprising a multiplicity of local retransmission relays designed to serve a respective cell, each local relay transmitting as a localization signal a zone reference sequence of a zone of rank n, the rank of which is greater than or equal to the maximum value such that said zone includes the cell served by said local relay, the terminal comprising means for displaying the zone reference sequence received.

12. The system according to claim 4, further comprising a geographic map showing said division of a terrestrial globe into zones of rank n, and indicating the zone reference sequences associated with said zones, the value of rank n being selected to be adapted to the scale of the map.

13. The system according to claim 4, further comprising a tool designed to be pointed at a point and means for pointing the tool in a zone determined by said zone reference sequence.

14. The system according to claim 4, further comprising a calculator adapted to the conversion of numbers of base 10 to base 9 and vice versa.

15. A system for localizing an area in a digital image constituted by pixels, wherein the digital image is divided into nine zones of a first rank obtained by dividing the surface into three parts in two different directions, a predetermined respective number from 1 to 9 is attributed to each of the zones of first rank, each zone of rank n is divided in a same manner into nine zones of higher rank n+1, n being an integer number successively equal to from 1 to m, m being adapted to the size and number of pixels of the image, a predetermined respective number from 1 to 9 being attributed to each of the zones of rank n+1 in the zone of rank n, and a zone of rank n is localized by a zone reference sequence having n digits containing the number of said zone, and the respective numbers of all of zones of lower rank n−1 to 1, in which said zone is located, said system comprising:

means for determining the zone reference sequence of a zone of rank n in which is located an area to be localized in the image, n being the maximum value such that the surface of the area to be localized is included in said zone of rank n, and means for manipulating said zone reference sequence.

16. A method of geographically localizing an area of a terrestrial globe in relation to a predetermined meridian of the terrestrial globe, comprising:

dividing the terrestrial globe into two hemispherical zones with a radial plane passing through the meridian, dividing successively the surface of each hemispherical zone into zones of rank n, n being an integer value greater than or equal to 1, obtained by dividing successively each zone of lower rank n−1 into three substantially identical spherical sectors by two radial planes each including a respective meridian, and each of three spherical sectors by two planes perpendicular to the radial planes each including a respective parallel, so as to obtain nine zones for each rank n, attributing a predetermined respective number from 1 to 9 to each of the zones of rank n in each zone of lower rank n−1, determining the position of the area to be localized by associating the respective numbers of zones of rank 1 to n, and a respective sign indicating the hemispherical zone, in which is located the area to be localized, to obtain a zone reference sequence localizing said area, and manipulating said zone reference sequence.

17. A computer program stored on a medium for operation on a computer system comprising code which:

divides the terrestrial globe into two hemispherical zones with a radial plane passing through the meridian, divides the surface of each hemispherical zone into zones of rank n obtained by dividing successively each zone of lower rank n−1 into three substantially identical spherical sectors by two radial planes each including a respective meridian, and each of three spherical sectors by two planes perpendicular to the radial planes each including a respective parallel, n being an integer number equal to or greater than 1, attributes a predetermined respective number from 1 to 9 to each of the zones of rank n in each zone of lower rank n−1, determines a position of an area to be localized by associating the respective numbers of zones of ranks 1 to n, and a respective sign indicating the hemispherical zone, in which is located the area to be localized, to obtain a zone position sequence of said area, and manipulates said zone position sequence.

18. A fixed or mobile geographic positioning device comprising a computer program according to claim 17.

19. A system for localizing an area in space in relation to a predetermined point on an essentially spherical surface, wherein the surface is divided into nine zones of first rank obtained by dividing the surface into three parts in two different directions, a predetermined respective number from 1 to 9 is attributed to each of the zones of first rank, each zone of rank n, n being an integer successively equal to from 1 to m, being divided in the same manner into nine zones of higher rank n+1, a predetermined respective number from 1 to 9 being attributed to each of the zones of rank n+1, and a zone of rank n is localized by a zone reference sequence having n digits containing the number of said zone and the respective numbers of all of the zones of lower rank n−1 to 1, in which said zone is located, comprising:

means for determining the position reference sequence of a zone of rank n in which is located a zone to be localized in the surface, n being the maximum value such that the surface of the zone to be localized is included in said zone of rank n, and the zone to be localized being zone referenced in relation to a predetermined meridian of the spherical surface, the spherical surface having been previously divided into two hemispherical zones by a radial plane passing through a meridian selected as reference, the nine zones of first rank being obtained by dividing each hemispherical zone into three spherical sectors of identical preference by two radial planes each including a respective meridian, and each of the three spherical sectors by two planes perpendicular to the radial planes and each including a respective parallel.

* * * * *